United States Patent
Shima et al.

(10) Patent No.: US 12,319,289 B2
(45) Date of Patent: Jun. 3, 2025

(54) DRIVER ASSISTANCE APPARATUS

(71) Applicant: SUBARU CORPORATION, Tokyo (JP)

(72) Inventors: Yoshiki Shima, Tokyo (JP); Koji Matsuno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 12 days.

(21) Appl. No.: 18/521,819

(22) Filed: Nov. 28, 2023

(65) Prior Publication Data

US 2024/0182033 A1    Jun. 6, 2024

(30) Foreign Application Priority Data

Dec. 5, 2022  (JP) ................ 2022-194125

(51) Int. Cl.
  *B60W 30/18*   (2012.01)
  *B60W 50/14*   (2020.01)

(52) U.S. Cl.
  CPC ...... *B60W 30/18145* (2013.01); *B60W 50/14* (2013.01)

(58) Field of Classification Search
  CPC .......... B60W 30/18145; B60W 50/14; B60W 10/184; B60W 10/20; B60W 2520/16; B60W 2530/20; B60W 2552/40; B60W 2554/4042; B60W 2710/182; B60W 2710/207; B60W 30/02; B60W 40/00
  See application file for complete search history.

(56) References Cited

U.S. PATENT DOCUMENTS

| | | | |
|---|---|---|---|
| 2006/0217867 A1* | 9/2006 | Ono | B62D 6/003 701/41 |
| 2007/0055432 A1* | 3/2007 | Koibuchi | B60W 40/11 701/72 |
| 2009/0030572 A1* | 1/2009 | Takahashi | B60W 50/14 701/41 |
| 2018/0134152 A1* | 5/2018 | Nagayama | B60W 40/072 |
| 2019/0381989 A1* | 12/2019 | Nozu | B60W 10/08 |

FOREIGN PATENT DOCUMENTS

| | | |
|---|---|---|
| JP | 2003-312465 A | 11/2003 |
| JP | 2009-029181 A | 2/2009 |
| JP | 2010-173452 A | 8/2010 |
| JP | 2019-217838 A | 12/2019 |

* cited by examiner

*Primary Examiner* — Sizo B Vilakazi
(74) *Attorney, Agent, or Firm* — Rimon P.C.

(57) ABSTRACT

A driver assistance apparatus includes a tire force margin calculation unit of a front inner wheel in cornering, a driving operation command output unit, and an information presentation unit. The tire force margin calculation unit of the front inner wheel in cornering estimates, on the occasion of cornering of a vehicle, a tire force limit and a tire force current value of the front inner wheel in cornering, and calculates a tire force margin based on the tire force limit and the tire force current value. In accordance with a decline in the tire force margin of the front inner wheel in cornering, the driving operation command output unit outputs a driving operation command that causes restoration of the tire force margin. The information presentation unit presents a driver who drives the vehicle with information regarding the driving operation command outputted by the driving operation command output unit.

10 Claims, 20 Drawing Sheets

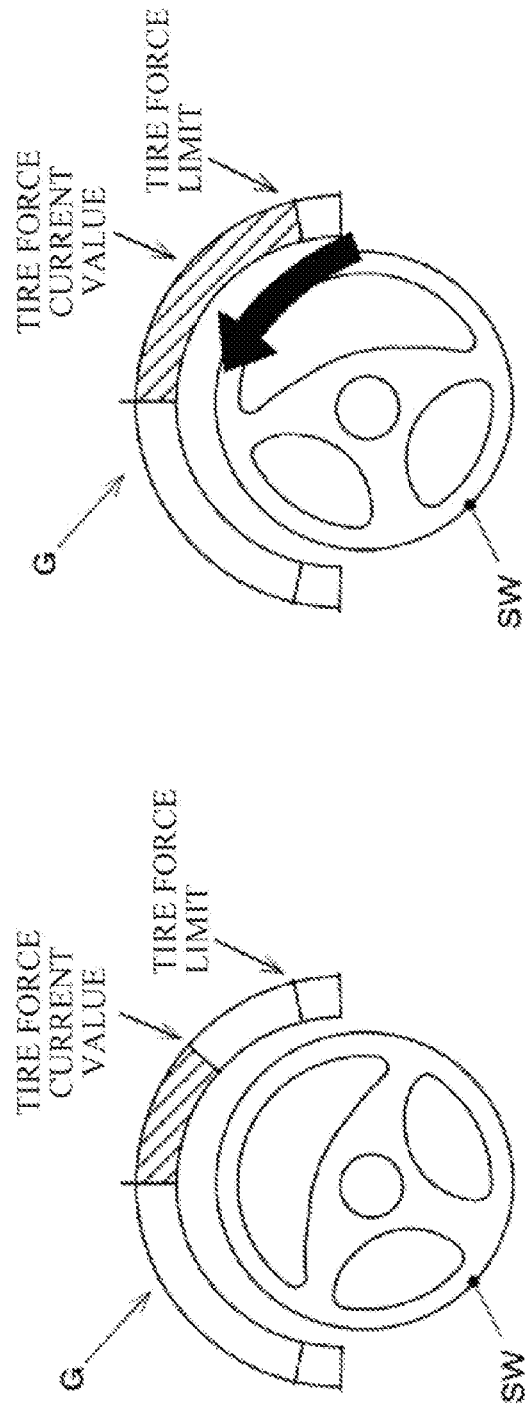

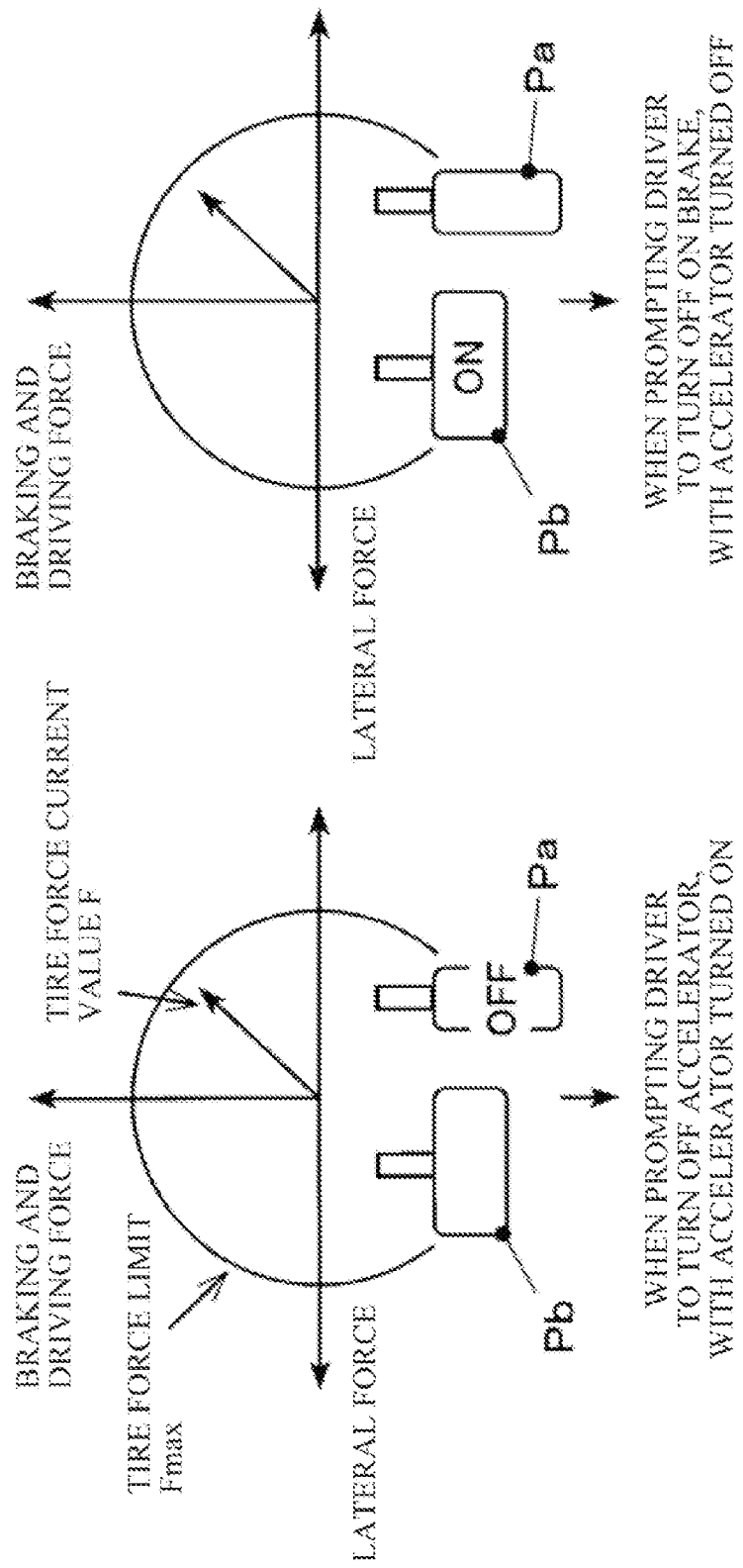

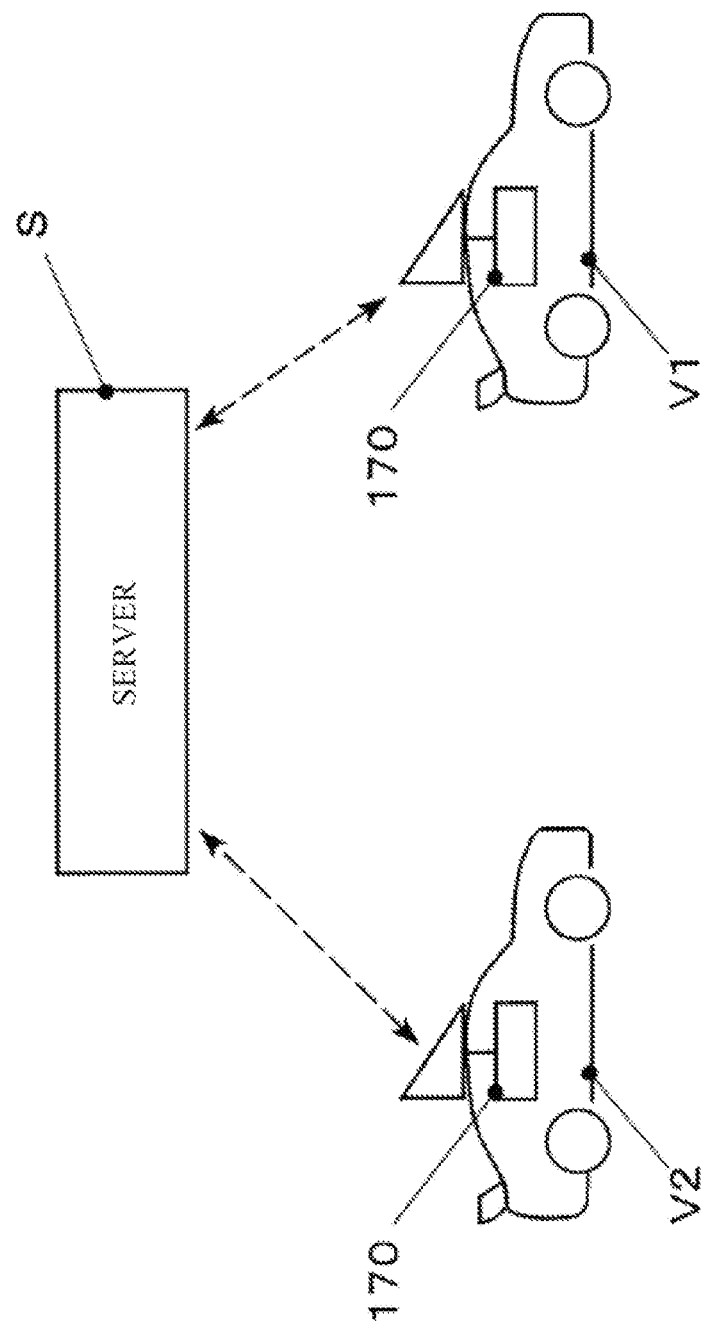

DRIVER ASSISTANCE APPARATUS

CROSS-REFERENCE TO RELATED APPLICATIONS

The present application claims priority from Japanese Patent Application No. 2022-194125 filed on Dec. 5, 2022, the entire contents of which are hereby incorporated by reference.

BACKGROUND

The disclosure relates to a driver assistance apparatus that presents a driver who drives a vehicle with a driving operation that does not cause an excess over a tire force limit.

There have been techniques related to, for example, estimation of a state of a tire of a vehicle on travel, and a control based on a result of the estimation. For example, Japanese Unexamined Patent Application Publication (JP-A) No. 2009-029181 describes a cornering behavior display device that allows for instantaneous recognition of a control state of a cornering force. The cornering behavior display device includes a yaw moment display on which segments are arranged from a datum part of the yaw moment display unit toward a direction of cornering. The number of segments on display is increased and decreased in an arc state in accordance with a relative difference between torque of an outer wheel in cornering and torque of an inner wheel in cornering. Thus, the cornering behavior display device makes it possible to intuitively, visually recognize a control state of cornering behavior of a vehicle.

JP-A No. 2010-173452 describes an information presentation apparatus that makes presentation of a margin of a braking or driving force produced by a user's driving operation. The information presentation apparatus carries out a presentation control that includes: calculating the braking or driving force and a reference braking or driving force of a vehicle, based on vehicle data; obtaining the margin of the braking or driving force with respect to the reference braking or driving force; and making presentation of the margin thus calculated.

JP-A No. 2003-312465 describes a grip degree estimation apparatus to be applied to a vehicle. The grip degree estimation apparatus estimates a grip degree that indicates a degree of a tire force in a lateral direction with respect to a wheel. The grip degree estimation apparatus estimates self-aligning torque of a front wheel based on steering torque or a steering force, while estimating a side force or a slip angle of the front wheel based on a vehicle state amount. The grip degree estimation apparatus estimates the grip degree of the front wheel based on a change in the self-aligning torque with respect to the side force or the slip angle.

Moreover, JP-A No. 2003-312465 provides a description that, when the grip degree is smaller than a predetermined value, a notification is given to a driver by an indicator or a sound producing device, and a sound is outputted to prompt the driver to release an accelerator operation or make a brake operation.

JP-A No. 2019-217838 describes a control apparatus to be applied to a four-wheel drive vehicle. The control apparatus includes a tire frictional force use factor calculator, and a braking and driving force adjustment controller. The tire frictional force use factor calculator calculates a tire frictional force use factor that is a ratio of a composite force of a longitudinal force and a lateral force to a size of a tire friction circle for each wheel. The braking and driving force adjustment controller adjusts a driving force or a braking force acting on each wheel. When the tire frictional force use factor of any of the wheels becomes greater than a threshold value, the control apparatus suppresses an increase in the driving force or the braking force of the relevant wheel, while raising the driving force or the braking force of another wheel selected based on a situation of a driving operation made by a driver.

SUMMARY

An aspect of the disclosure provides a driver assistance apparatus including a tire force margin calculation unit of a front inner wheel in cornering, a driving operation command output unit, and an information presentation unit. The tire force margin calculation unit of the front inner wheel in cornering is configured to estimate, on the occasion of cornering of a vehicle, a tire force limit and a tire force current value of the front inner wheel in cornering, and configured to calculate a tire force margin based on the tire force limit and the tire force current value. The driving operation command output unit is configured to output, in accordance with a decline in the tire force margin of the front inner wheel in cornering, a driving operation command that causes restoration of the tire force margin. The information presentation unit is configured to present a driver who drives the vehicle with information regarding the driving operation command outputted by the driving operation command output unit.

An aspect of the disclosure provides a driver assistance apparatus including a tire force margin calculation unit of a front inner wheel in cornering, a driving operation command output unit, and an information presentation unit. The tire force margin calculation unit of the front inner wheel in cornering is configured to estimate, on the occasion of cornering of a first vehicle, a tire force limit and a tire force current value of the front inner wheel in cornering, and configured to calculate a tire force margin based on the tire force limit and the tire force current value. The driving operation command output unit is configured to output, in accordance with a decline in the tire force margin of the front inner wheel in cornering, a driving operation command that causes restoration of the tire force margin. The information presentation unit is configured to present a driver who drives a second vehicle following the first vehicle, with information regarding the driving operation command outputted by the driving operation command output unit.

An aspect of the disclosure provides a driver assistance apparatus including circuitry. The circuitry is configured to estimate, on the occasion of cornering of a vehicle, a tire force limit and a tire force current value of a front inner wheel in cornering, and calculate a tire force margin based on the tire force limit and the tire force current value. The circuitry is configured to output, in accordance with a decline in the tire force margin of the front inner wheel in cornering, a driving operation command that causes restoration of the tire force margin. The circuitry is configured to present a driver who drives the vehicle with information regarding the driving operation command outputted.

An aspect of the disclosure provides a driver assistance apparatus including circuitry. The circuitry is configured to estimate, on the occasion of cornering of a first vehicle, a tire force limit and a tire force current value of a front inner wheel in cornering, and calculate a tire force margin based on the tire force limit and the tire force current value. The circuitry is configured to output, in accordance with a decline in the tire force margin of the front inner wheel in cornering, a driving operation command that causes restoration of the tire force margin. The circuitry is configured to present a driver who drives a second vehicle following the first vehicle, with information regarding the driving operation command outputted.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 19A and 19B are diagrams illustrating other examples of the image display in the driver assistance apparatus according to the embodiment.

FIGS. 20A and 20B are diagrams illustrating other examples of the image display in the driver assistance apparatus according to the embodiment.

FIG. 21 is a schematic diagram of a system configuration of a driver assistance apparatus according to an embodiment of the disclosure.

DETAILED DESCRIPTION

Figure 1:
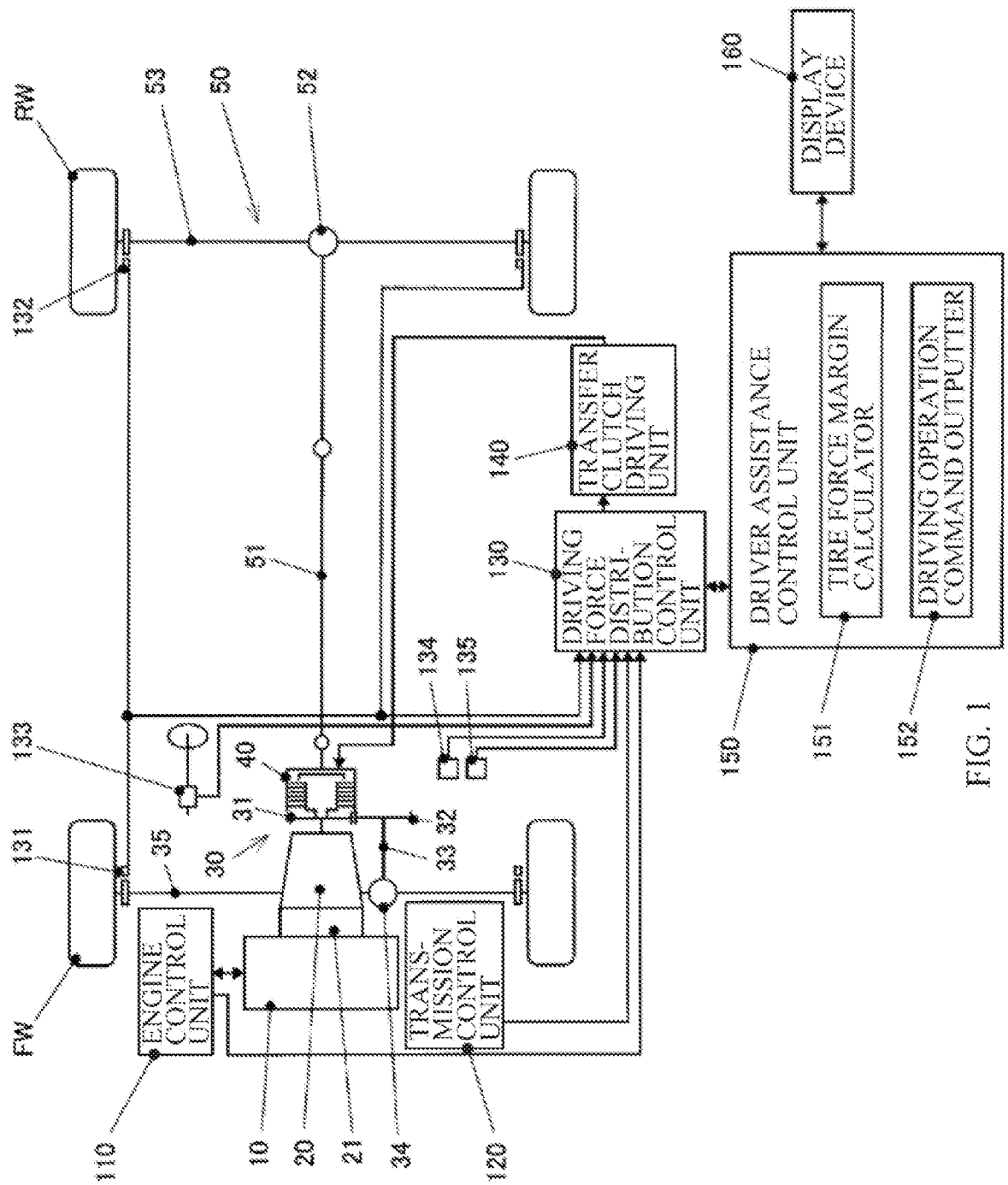
FIG. 1 is a schematic diagram of a configuration of a vehicle including a driver assistance apparatus according to an embodiment of the disclosure.

In the technique described in JP-A No. 2009-029181, the driver is presented with information regarding the relative difference between the torque of the outer wheel in cornering and the torque of the inner wheel in cornering. However, even when the driver is presented with such information, it is difficult for the driver to understand what kind of operation to make, based on the information.

In the technique described in JP-A No. 2010-173452, the information presentation apparatus makes the presentation of an average tire force margin of the driving wheels, instead of the tire force margin of each wheel. In particular, on the occasion of cornering, a front inner wheel in cornering has the greatest tire slip angle among the four wheels, and a vertical load of the front inner wheel in cornering decreases because of a load shift of a vehicle body. Thus, the tire force of the front inner wheel in cornering tends to reach a limit at an early stage. However, in the technique described in JP-A No. 2010-173452, it is difficult for the driver to know the tire force margin inherent to the front inner wheel in cornering. Even when the tire force of the front inner wheel in cornering is not greater than the presented tire force limit, there is possibility of a slip of the front inner wheel in cornering.

In the technique described in JP-A No. 2003-312465, the grip degrees of the left and right front wheels are collectively obtained based on the self-aligning torque. Accordingly, as with JP-A No. 2010-173452, it is difficult to appropriately present the driver with the state of the front inner wheel in cornering.

It is desirable to provide a driver assistance apparatus that makes it possible to present a driver with a driving operation that suppresses an excess over a tire force limit in cornering.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Embodiment

Description is given below of a driver assistance apparatus according to a first embodiment of the disclosure.

The driver assistance apparatus of the first embodiment may be provided in, for example, an automobile such as a four-wheel drive passenger car configured to drive right and left front wheels, and right and left rear wheels.

The driver assistance apparatus is configured to calculate tire force margins of the right and left front wheels on the occasion of cornering of the vehicle. In accordance with a decline in the tire force margin of the front inner wheel in cornering, the driver assistance apparatus is configured to present a driver with, for example, a driving operation command that causes restoration of the tire force margin.

FIG. 1 schematically illustrates a configuration of a vehicle including the driver assistance apparatus according to the first embodiment.

The vehicle 1 may include, for example, right and left front wheels FW in a pair, right and left rear wheels RW in a pair, an engine 10, a transmission 20, a front wheel driving force transmission mechanism 30, a transfer clutch 40, a rear wheel driving force transmission mechanism 50, an engine control unit 110, a transmission control unit 120, a driving force distribution control unit 130, a transfer clutch driving unit 140, a driver assistance control unit 150, and a display device 160.

The engine 10 is a travel power source of the vehicle.

As the engine 10, for example, a four-stroke gasoline engine may be used.

It is to be noted that the travel power source of the vehicle 1 is not limited to the engine 10. The travel power source of the vehicle 1 may include an engine-electric hybrid system including the engine 10 and a motor generator, or alternatively, the travel power source of the vehicle 1 may include solely a motor generator.

The transmission 20 may include a transmission mechanism configured to reduce or increase a rotation speed of an output shaft of the engine 10 at a predetermined shifting ratio.

The transmission mechanism may include, for example, a continuously variable transmission (CVT) variator of, for example, a chain type or a belt type, or multiple planetary gear sets, without limitation.

Between the engine 10 and the transmission 20, a torque converter 21 is provided.

The torque converter 21 is a fluid coupling that serves as a starting device configured to cause starting at a vehicle speed of zero.

The torque converter 21 may include a lock-up clutch configured to restrain relative rotation between an input unit, i.e., an impeller, and an output unit, i.e., a turbine, under predetermined conditions.

The front wheel driving force transmission mechanism 30 is a motive power transmission mechanism configured to transmit rotation of an output shaft of the transmission 20 to the right and left front wheels FW.

The front wheel driving force transmission mechanism 30 may include, for example, a drive gear 31, a driven gear 32, a pinion shaft 33, a front differential 34, and front drive shafts 35.

The drive gear 31 and the driven gear 32 are a pair of helical gears provided on parallel axes.

The drive gear 31 is directly coupled to the output shaft of the transmission 20.

The driven gear 32 is provided on the pinion shaft 33.

The pinion shaft 33 is a rotation axis configured to transmit, to the front differential 34, torque transmitted from the transmission 20 through the drive gear 31 and the driven gear 32.

The pinion shaft 33 may include a pinion gear configured to transmit a driving force to an unillustrated ring gear provided on an outer periphery of the front differential 34.

The pinion gear of the pinion shaft 33 and the ring gear of the front differential 34 may serve as a final reduction gear.

The front differential 34 is a differential mechanism configured to transmit, to the right and left front drive shafts 35, the driving force transmitted from the pinion shaft 33, and absorb a difference in a rotation speed between the right and left front wheels FW.

The front drive shafts 35 are rotation axes configured to transmit the driving force from the front differential 34 to the right and left front wheels FW.

The front drive shafts 35 may include, for example, a universal joint configured to change a direction of rotation, to follow strokes of suspensions and steering of the front wheels FW.

The transfer clutch 40 is a fastening element provided between the output shaft of the transmission 20 and a front end of a propeller shaft 51 of the rear wheel driving force transmission mechanism 50.

The transfer clutch 40 may include a wet multi-plate clutch of, for example, a hydraulic type or an electromagnetic type. The wet multi-plate clutch is configured to change the torque transmitted from the output shaft of the transmission 20 to the propeller shaft 51, by adjusting a restraining force.

The transfer clutch 40 is configured to continuously change the restraining force between a front shaft and a rear shaft, from a locked state, i.e., a directly coupled state, to a free state, i.e., a released state. The front shaft is coupled to the output shaft of the transmission 20. The rear shaft is coupled to the front end of the propeller shaft 51. In the free state, no torque is transmitted except for friction that inevitably occurs.

The drive gear 31, the driven gear 32, the pinion shaft 33, the front differential 34, and the transfer clutch 40 of the front wheel driving force transmission mechanism 30 may be housed in an unillustrated transmission case. The transmission case may be a housing common to the transmission 20.

The rear wheel driving force transmission mechanism 50 is a motive power transmission mechanism configured to transmit, to the right and left rear wheel RW, the rotation of the output shaft of the transmission 20 transmitted through the transfer clutch 40.

The rear wheel driving force transmission mechanism 50 may include, for example, the propeller shaft 51, a rear differential 52, and rear drive shafts 53.

The propeller shaft 51 is a rotation axis configured to transmit the driving force from the rear shaft of the transfer clutch 40 to the rear differential 52.

The rear differential 52 is a differential mechanism configured to transmit, to the right and left rear drive shafts 53, the driving force transmitted from the propeller shaft 51, and absorb a difference in a rotation speed between the right and left rear wheels RW.

The rear differential 52 may include a final reduction gear configured to reduce a rotation speed of the propeller shaft 51 at a predetermined final reduction ratio, and transmit the resultant rotation speed to the rear drive shafts 53.

The rear drive shafts 53 are rotation axes configured to transmit the driving force from the rear differential 52 to the right and left rear wheels RW.

The rear drive shafts 53 may include, for example, a universal joint configured to convert a direction of rotation, to follow strokes of suspensions.

The engine control unit 110 is a device configured to comprehensively control the engine 10 and its auxiliaries.

The engine control unit 110 is configured to set request torque in accordance with, for example, an amount of an accelerator operation by the driver, and control an output of the engine 10 to allow actual torque to match the request torque. The actual torque is torque to be actually generated by the engine 10.

The engine control unit 110 is configured to transmit an estimated value of the actual torque of the engine 10 to the driving force distribution control unit 130. The estimated value of the actual torque usually matches the request torque.

The transmission control unit 120 is a device configured to comprehensively control the transmission 20 and its auxiliaries.

The transmission control unit 120 is configured to control a shifting ratio in the transmission 20 and a fastening force of the lock-up clutch in the torque converter 21.

The transmission control unit 120 is configured to transmit, to the driving force distribution control unit 130, data regarding the shifting ratio in the transmission 20 and a torque ratio when the torque converter 21 generates a torque amplification effect.

The driving force distribution control unit 130 is a device configured to control a fastening force of the transfer clutch 40 through the transfer clutch driving unit 140, to control driving force distribution between the front and rear shafts.

The driving force distribution control unit 130 is configured to set a target value of the longitudinal distribution of the driving force in accordance with a current travel state of the vehicle 1, e.g., an acceleration or deceleration state and a state of cornering, and control the fastening force of the transfer clutch 40 in accordance with the target value.

The driving force distribution control unit 130 may serve as a driving force estimation apparatus configured to estimate, in real time, the current driving forces of the front wheels FW and the rear wheels RW. Details of the estimation of the current driving forces are described later.

To the driving force distribution control unit 130, for example, vehicle speed sensors 131 and 132, a steering angle sensor 133, an acceleration rate sensor 134, and a yaw rate sensor 135 may be coupled.

The vehicle speed sensors 131 and 132 are sensors configured to output vehicle speed signals respectively corresponding to rotation speeds, or angular velocities, of the front wheels FW and the rear wheels RW.

The vehicle speed sensors 131 and 132 may be provided in respective hubs configured to rotatably support the front wheels FW and the rear wheels RW.

The vehicle speed sensors 131 and 132 may be respectively provided on the right and left front wheels FW, and the right and left rear wheels RW.

The steering angle sensor 133 is a sensor configured to detect a steering wheel angle θH. The steering wheel angle θH is an angular position of a steering wheel. The steering wheel serves as an input member of a steering device with which the driver makes a steering operation.

The driving force distribution control unit 130 is configured to calculate a steering angle of the front wheels FW based on the steering wheel angle θH detected by the steering angle sensor 133 and a gear ratio n of an unillustrated steering gearbox. The gear ratio n is a constant.

The acceleration rate sensor 134 is a sensor configured to detect a longitudinal acceleration rate and a lateral, or vehicle-widthwise, acceleration rate that act on a vehicle body.

The yaw rate sensor 135 is a sensor configured to detect a yaw rate, i.e., a rotation speed around a vertical axis of the vehicle body.

The engine control unit 110, the transmission control unit 120, the driving force distribution control unit 130, and the driver assistance control unit 150 described later may include, for example, a microcomputer including, without limitation, a data processor such as a central processing unit (CPU), a storage such as a random access memory (RAM) and a read only memory (ROM), input and output interfaces, and a bus that couples them together.

The engine control unit 110, the transmission control unit 120, the driving force distribution control unit 130, and the driver assistance control unit 150 may be communicatably coupled either directly or through an in-vehicle local area network (LAN) such as a controller area network (CAN) communication system.

The transfer clutch driving unit 140 is a device configured to control the fastening force of the transfer clutch 40.

For example, when the transfer clutch 40 is of the hydraulic type, the transfer clutch driving unit 140 is configured to adjust hydraulic pressure as a source of the fastening force in the transfer clutch 40.

The transfer clutch driving unit 140 may include a pressure regulation valve configured to regulate hydraulic pressure supplied from an unillustrated oil pump provided in the transmission 20 and supply the resultant hydraulic pressure to the transfer clutch 40.

The transfer clutch driving unit 140 is configured to control the hydraulic pressure of the transfer clutch 40 in accordance with an instruction value from the driving force distribution control unit 130, to control the restraining force of the transfer clutch 40, i.e., transmission torque.

The driver assistance control unit 150 may include, for example, a tire force margin calculator 151 and a driving operation command outputter 152.

The tire force margin calculator 151 may calculate a tire force limit, a tire force current value, and a tire force margin of tires of the right and left front wheels, based on data regarding the travel state of the vehicle acquired from, for example, other units. The tire force is a force to be generated by a tire, or grip.

In one embodiment of the disclosure, the tire force margin calculator 151 may serve as a "tire force margin calculation unit of a front inner wheel in cornering" and a "tire force margin calculation unit of a front outer wheel in cornering".

The driving operation command outputter 152 may output a driving operation command that causes restoration of the tire force margin, i.e., an increase in the tire force margin, mainly in accordance with a decline in the tire force margin of the front inner wheel in cornering.

In one embodiment of the disclosure, the driving operation command outputter 152 may serve as a "a driving operation command output unit".

Details of the tire force margin calculator 151 and the driving operation command outputter 152 are described later.

The display device 160 may be, for example, an image display device configured to present the driver of the vehicle with, for example, information regarding the driving operation command to be outputted by the driver assistance control unit 150.

In one embodiment of the disclosure, the display device 160 may serve as an "information presentation unit".

Non-limiting examples of display modes of the display device 160 are described in detail later.

In the following, description is given of a calculation method of the tire force limit and the tire force margin of the tire in the tire force margin calculator 151.

Calculation of Tire Force Limit

The tire force limit of a tire is a maximum braking and driving force Fmax, and is calculated based on Coulomb's frictional law by using the following Expression 1.

$$Fmax = \mu W g \quad \text{(Expression 1)}$$

W: load to be applied to the front inner wheel in cornering.

An amount of lateral load shift $\Delta Wy$ and an amount of longitudinal load shift $\Delta Wx$ on the occasion of cornering are corrected by the following Expressions 2 and 3.

$$\Delta W_y = \frac{\ddot{y} W_S}{d_f} \left[ \frac{K_{\phi f} h_S}{K_{\phi f} + K_{\phi r} - W_S h_S} + \frac{l_r}{l} h_f \right] \quad \text{(Expression 2)}$$

$$\Delta W_x = \ddot{x} W_S \frac{h_g}{l_f} \quad \text{(Expression 3)}$$

ÿ: lateral acceleration rate
Ws: vehicle weight
df: front wheel tread
hs: distance from the gravitational center of the vehicle body to a roll axis
hg: height of the gravitational center
hf: height of a roll center of a front wheel suspension
l: wheel base
lf: distance from the gravitational center to a front wheel shaft
lr: distance from the gravitational center to a rear wheel shaft
Kφf: roll stiffness of the front wheel suspension
Kφr: roll stiffness of a rear wheel suspension Tire Force Margin The tire force margin is calculated by subtracting, from 1, a value obtained by dividing the tire force current value F by the tire force limit Fmax mentioned above. The tire force current value F is a force currently generated by the tire.

The tire force margin may take any value ranging from zero (0) to 1. The tire force margin approaching zero (0) indicates that the tire force is tight, or that the tire force is approaching the limit.

The tire force current value F is calculated based on a longitudinal braking and driving force Fx and a lateral force Fy by using the following Expression 4.

$$F = \sqrt{F_x^2 + F_y^2} \quad \text{(Expression 4)}$$

Here, the longitudinal braking and driving force Fx is a sum of the braking force and the driving force.

It is possible to calculate the lateral force Fy based on a tire slip angle described later and a cornering power.

Figure 2:
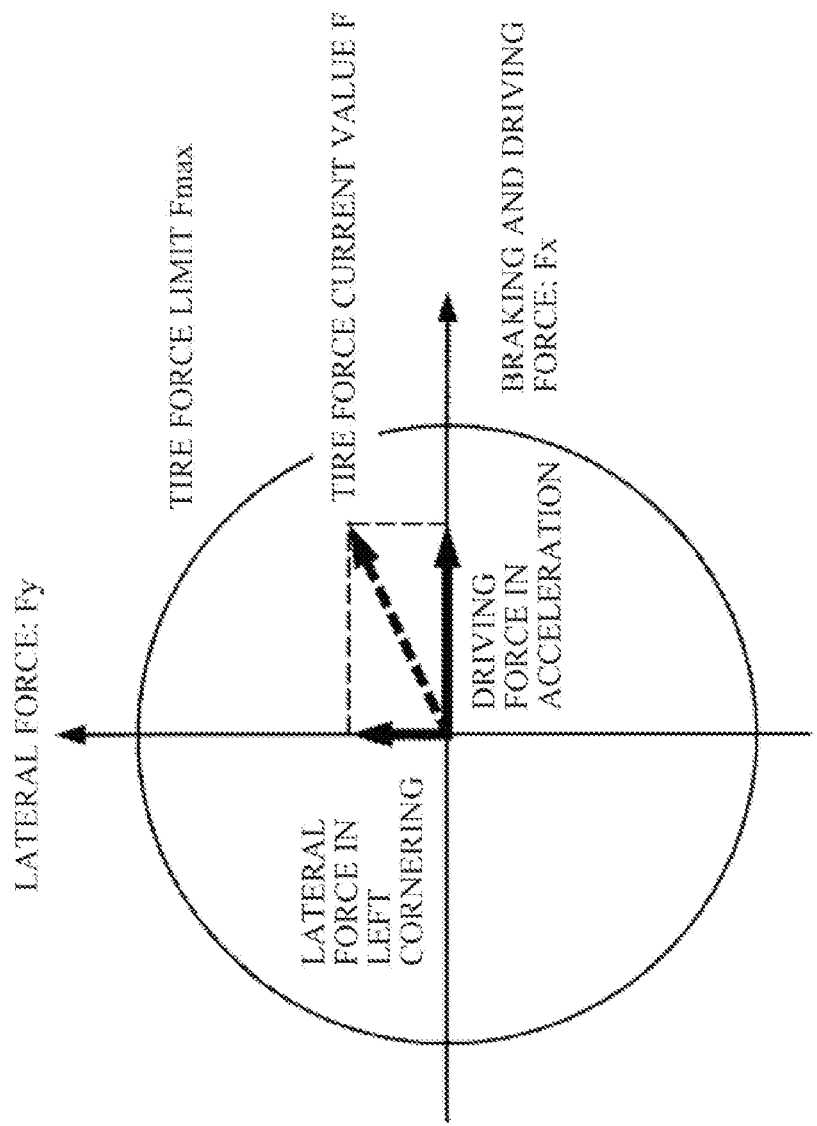
FIG. 2 is a diagram illustrating an example of relation between a tire force limit and a tire force current value of a tire.

FIG. 2 is a diagram illustrating an example of relation between the tire force limit and the tire force current value of the tire.

In FIG. 2, the horizontal axis denotes a longitudinal force. The right side of the horizontal axis denotes driving side, while the left side of the horizontal axis denotes braking side. The vertical axis denotes a lateral force. The upper side of the vertical axis denotes left side, while the lower side of the vertical axis denotes right side.

It is possible to express the maximum braking and driving force Fmax as a so-called frictional circle having a substantially constant radius.

The tire force current value F is a vector sum of the longitudinal braking and driving force Fx and the lateral force Fy. The tire force current value F never becomes greater than the maximum braking and driving force Fmax.

Calculation of Braking Force

When the longitudinal braking force of the tire is assumed to be Fb, the following Expression 5 is established.

$$F_b = -BP_f \frac{\pi DW_f^2}{4} \times BF_f \frac{DR_f}{Wr_f} \quad \text{(Expression 5)}$$

BPf: front wheel brake pressure
DWf: front wheel wheel cylinder radius
BFf: front wheel brake factor
DRf: front wheel brake rotor radius
Wrf: front wheel tire radius It is possible to obtain the front wheel brake pressure in accordance with the master cylinder hydraulic pressure, from a preset characteristic map.

Figure 3:
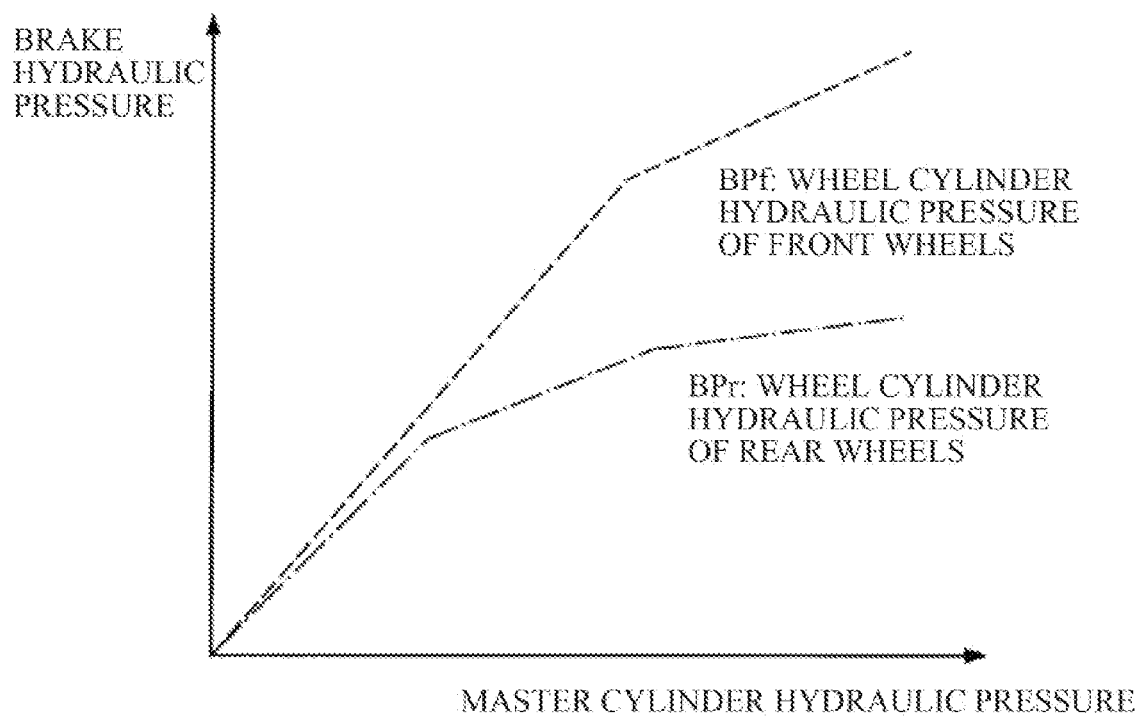
FIG. 3 is a diagram illustrating an example of a map to obtain a brake hydraulic pressure based on a master cylinder hydraulic pressure.

FIG. 3 illustrates an example of a map to obtain the brake hydraulic pressure from the master cylinder hydraulic pressure.

In FIG. 3, the horizontal axis denotes the master cylinder hydraulic pressure, and the vertical axis denotes the brake hydraulic pressure, i.e., the wheel cylinder hydraulic pressure of the front and rear wheels.

Here, the brake factor is a coefficient indicating a ratio between a brake input and an output. The brake factor is determined by a friction material used in a brake pad or a rotor, and a brake type.

The brake factor is generally about 0.6 to 0.9 both inclusive for disc brakes and about 1.5 to 8 both inclusive for drum brakes.

Calculation of Driving Force

Figure 4:
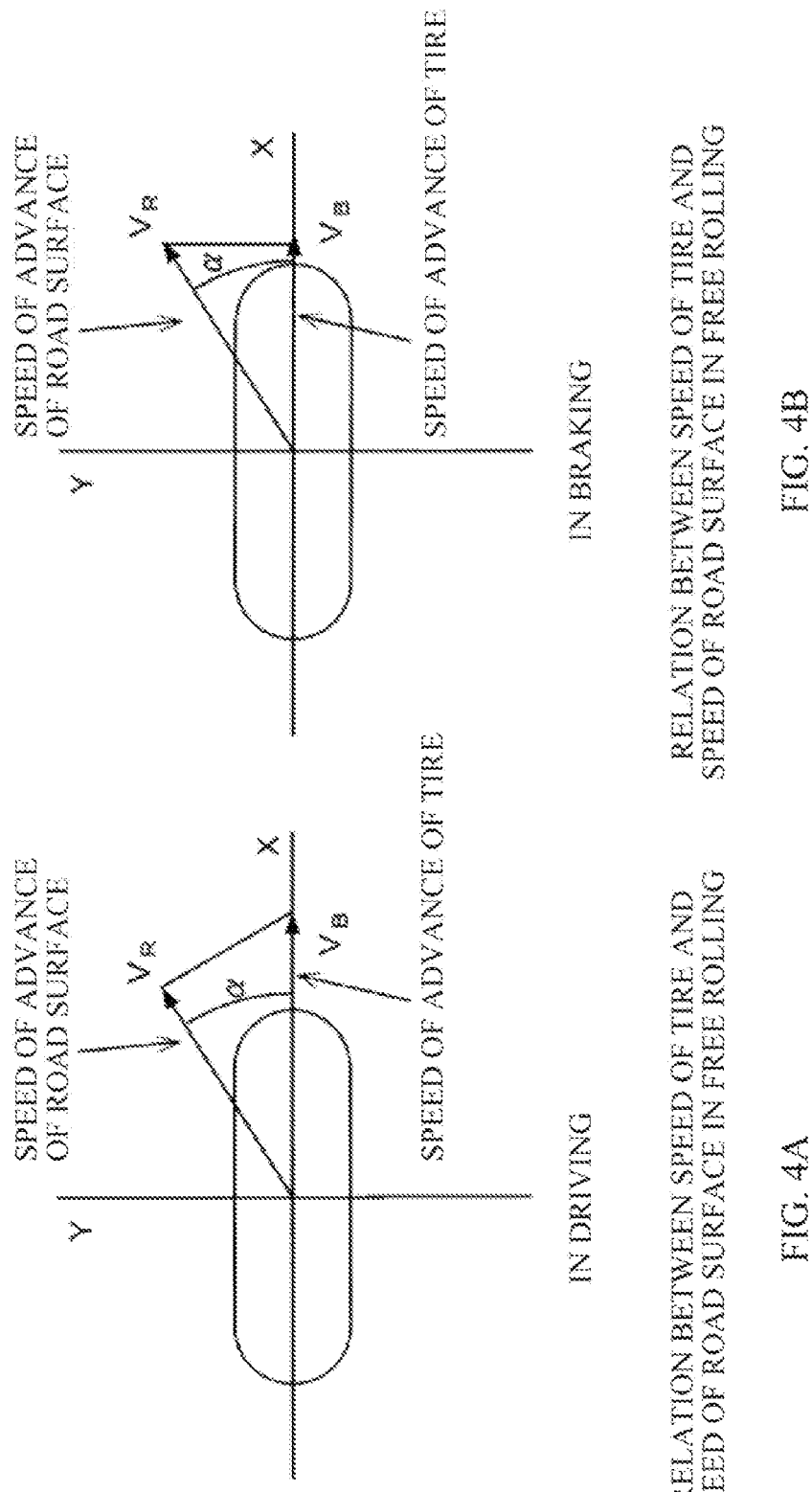
FIGS. 4A and 4B are diagrams illustrating relation between a speed of a tire, a speed of a road surface, and a slip angle.

A tire slip rate is defined as the following Expression 6 to prevent zero division on the occasion of wheel lock (VB=0) or a standing start (VR=0).

$$\lambda = \begin{cases} \dfrac{V_R \cos\alpha - V_B}{V_R \cos\alpha} \geq 0 & \text{(in braking)} \\ \dfrac{V_R \cos\alpha - V_B}{V_B} < 0 & \text{(in driving)} \end{cases} \quad \text{(Expression 6)}$$

λ: slip rate
VR: speed of a road surface=Vf_free, Vr_free
VB: average speed of a tread base in a ground plane
α: tire slip angle, or a slip angle FIGS. 4A and 4B illustrate relation between a speed of a tire, a speed of a road surface, and a slip angle.

FIG. 4A illustrates a state in driving, and FIG. 4B illustrates a state in braking.

The average speed VB of the tread base in the ground plane is expressed by the following Expression 7.

$$VB = r \cdot \omega \quad \text{(Expression 7)}$$

r: rolling radius of the tire

ω: rotation angular velocity

The braking or driving force F of the tire is expressed by the following Expression 8.

$$F = Kx \cdot \lambda \quad \text{(Expression 8)}$$

Kx: braking stiffness of the tire

λ: slip rate

Figure 5:
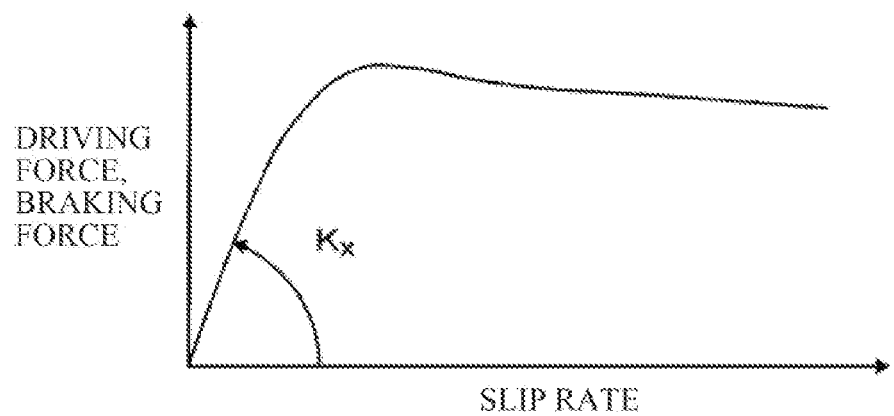
FIG. 5 is a diagram illustrating an example of correlation between a tire slip rate and a braking or driving force.

FIG. 5 illustrates an example of correlation between the tire slip rate and the braking or driving force.

In FIG. 5, the horizontal axis represents the slip rate, and the vertical axis represents the braking force or the driving force.

In FIG. 5, in a region where the slip rate is relatively small, the braking or driving force increases substantially in proportion to the slip rate. An inclination in such a region makes the braking stiffness Kx.

A grounding width w and a grounding length l of the tire are expressed by the following Expressions 9 and 10.

$$w = w_0 \left(\frac{Fz}{Fz_0}\right)^{1/4} \quad \text{(Expression 9)}$$

$$l = \frac{l_0 \left(\frac{Fz}{Fz_0}\right)^{1/2}}{2} \quad \text{(Expression 10)}$$

w: grounding width w0: grounding width when the vertical load is Fz0 l: grounding length l0: grounding length when the vertical load is Fz0

Fz: vertical load

When considering a model of a tire structure, the braking stiffness is proportional to a product of the square of the grounding length and the grounding width. The braking stiffness almost matches the driving stiffness. Thus, the braking stiffness is proportional to the $1^{1/4}$ power of the vertical load. There is nothing wrong with handling the $1^{1/4}$ power as the first power.

Figure 6:
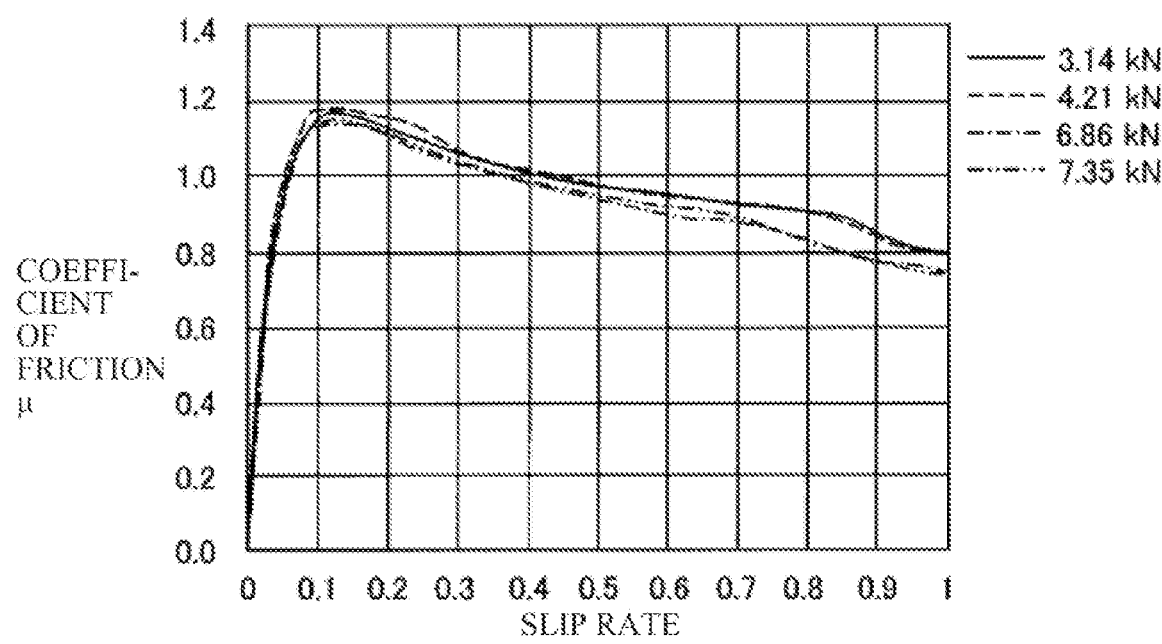
FIG. 6 is a diagram illustrating a general µ-s characteristic obtained by dividing the braking or driving force by a vertical load.

FIG. 6 illustrates a general μ-s characteristic obtained by dividing the braking or driving force by the vertical load.

The horizontal axis represents the slip rate, and the vertical axis represents the coefficient of friction.

As illustrated, it can be seen that the braking stiffness or the driving stiffness is substantially constant regardless of changes in the vertical load.

Figure 7:
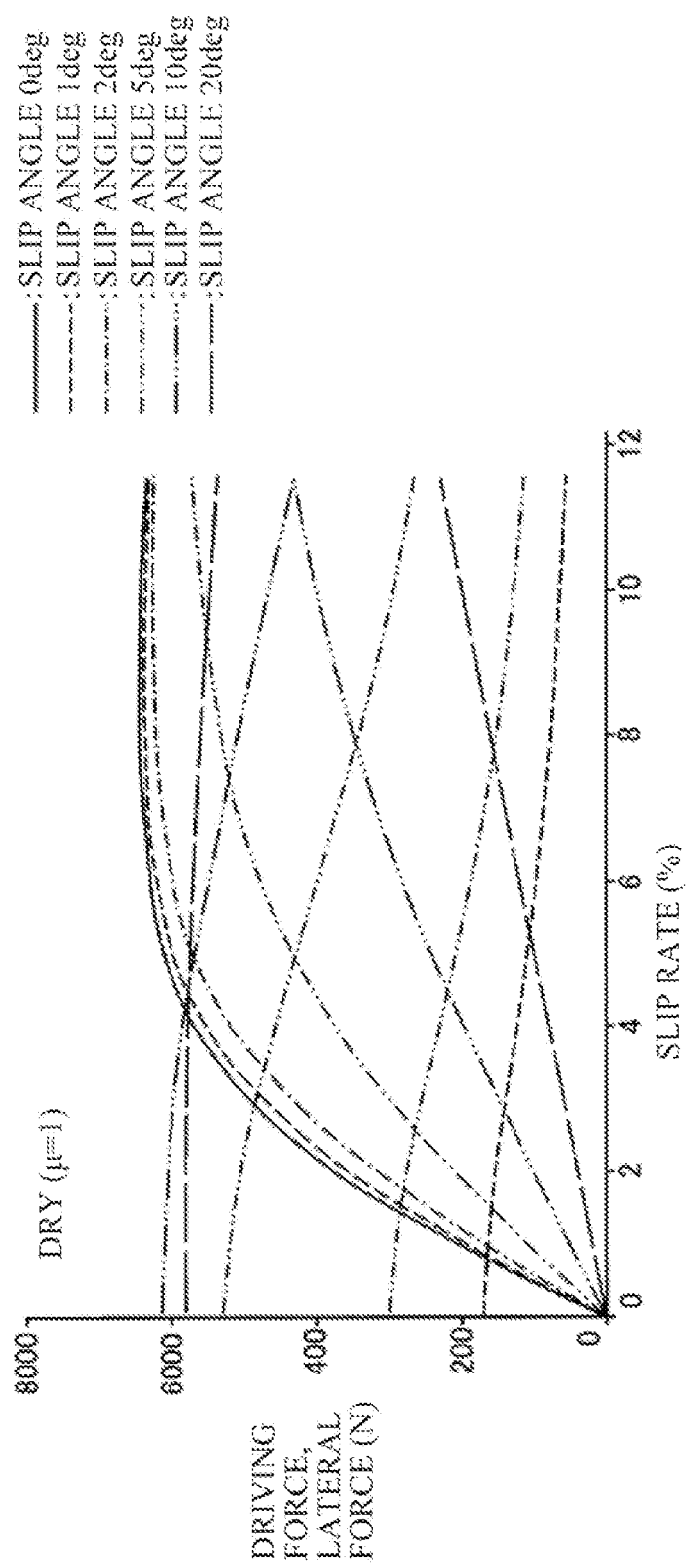
FIG. 7 is a diagram illustrating an example of trial calculation of a braking stiffness or a driving stiffness on the occasion of cornering with a tire model, illustrating an example of a dry road surface.
Figure 8:
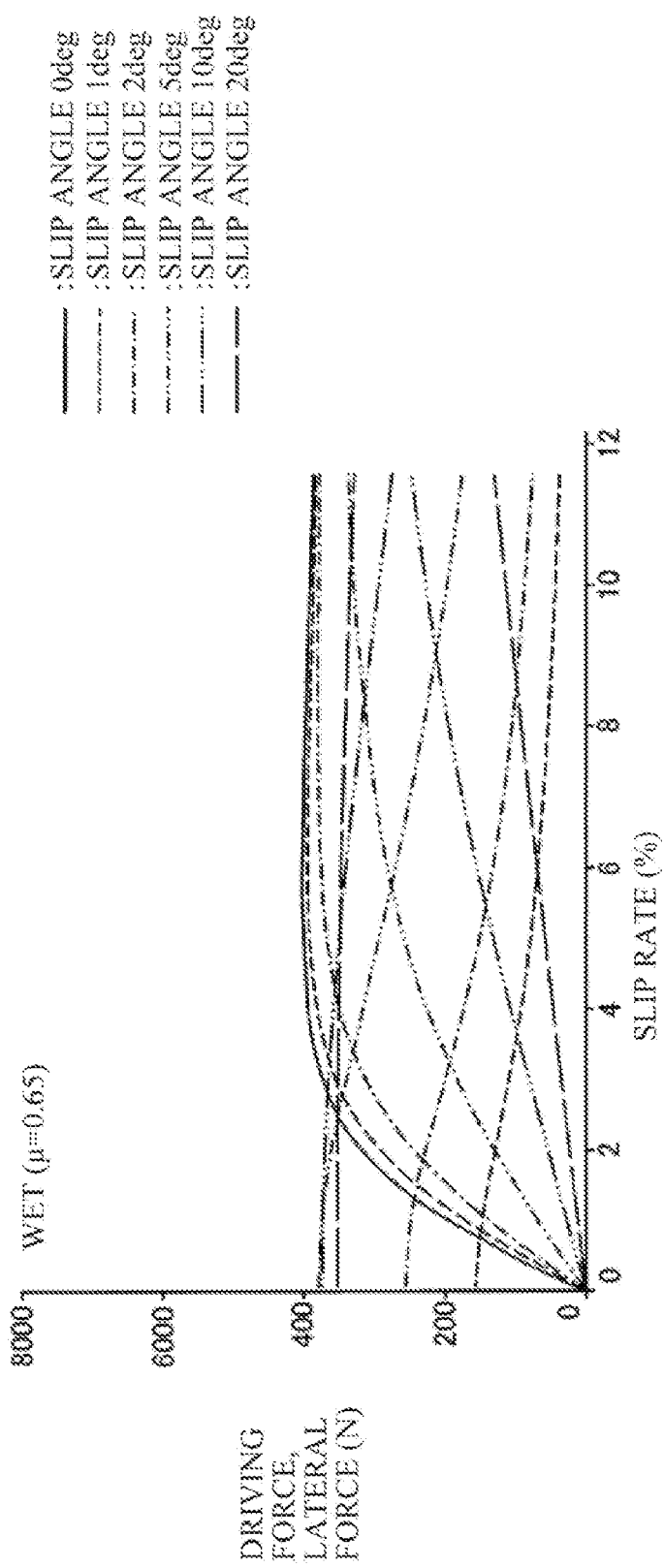
FIG. 8 is a diagram illustrating an example of the trial calculation of the braking stiffness or the driving stiffness on the occasion of cornering with the tire model, illustrating an example of a wet road surface.

FIGS. 7 and 8 illustrate examples in which the braking stiffness or the driving stiffness on the occasion of cornering is estimated with the tire model.

FIG. 7 illustrates an example where the road surface μ equals to 1.0 (μ=1.0) that corresponds to a dry paved road surface. FIG. 8 illustrates an example where the road surface μ equals to 0.65 (μ=0.65) that corresponds to a wet paved road surface.

As can be seen from these figures, the braking stiffness or the driving stiffness Kx when the tire slip angle α equals to 0 (α=0), i.e., a gradient of the braking and driving force with respect to the slip rate when the slip rate λ equals to 0 (λ=0), is determined by characteristics of the tire structure, and therefore, does not depend on the road surface μ, but decreases with an increase in the tire slip angle α as the vehicle is cornering.

It is possible to calculate the tire slip angle α from a vehicle body slip angle β estimated with a vehicle model.

The total driving force FxEG of the vehicle is expressed by the following Expression 11.

Total driving force FxEG=(engine output torque−drag torque−transmission hydraulic pump loss)× torque converter torque ratio×transmission shifting ratio (Expression 11)

It is possible to estimate the engine output torque from an operation state of the engine 10.

The drag torque, i.e., friction torque, is a constant.

It is possible to acquire the transmission hydraulic pump loss, the torque converter torque ratio, and the transmission shifting ratio from the transmission control unit 120.

Figure 9:
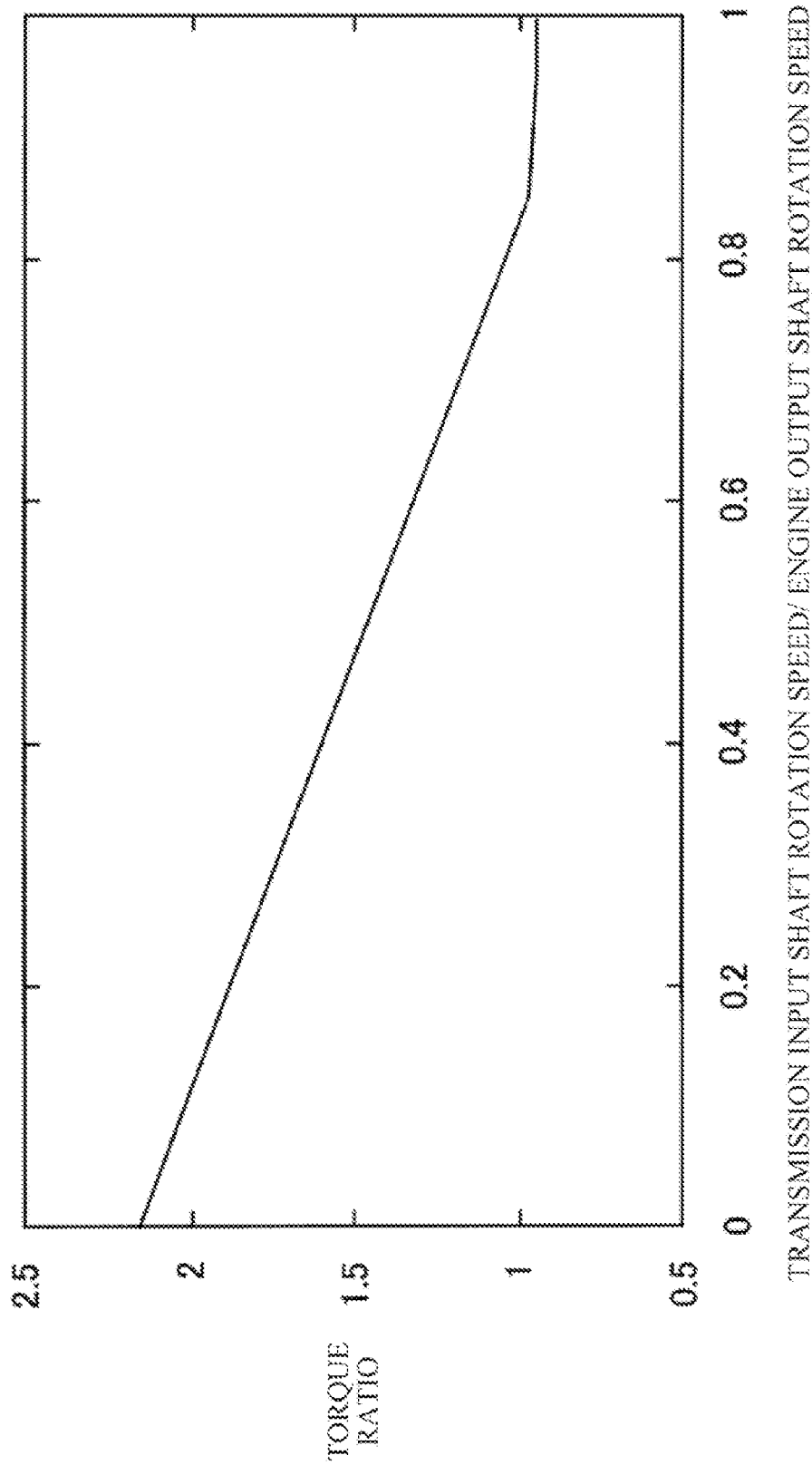
FIG. 9 is a diagram illustrating an example of a torque ratio characteristic of a torque converter.

FIG. 9 illustrates an example of a torque ratio characteristic of the torque converter.

In FIG. 9, the horizontal axis denotes a rotation speed ratio, and the vertical axis denotes the torque ratio, i.e., a torque amplification ratio. The rotation speed ratio is a value obtained by dividing a rotation speed of an input shaft of the transmission by the rotation speed of the output shaft of the engine.

As illustrated in FIG. 9, the torque ratio increases with a decline in the rotation speed ratio.

Peripheral speeds Vwf and Vwr of the front wheels FW and the rear wheels RW are expressed by the following Expression 12.

Vwf,Vwr=average wheel speed of the right and left wheels×tire diameter of the front or rear wheels (actual value)/tire diameter of the front or rear wheels (set value) (Expression 12)

Here, the set value of the tire diameter refers to a tire diameter to be used in calculating the vehicle speed based on the outputs of the vehicle speed sensors 131 and 132.

Values Vtf and Vtr obtained by converting rotation speeds of the front and rear shafts of the transfer clutch 40 into peripheral speeds of the tires are expressed by the following Expression 13.

Vtf,Vtr=average wheel speed of the right and left wheels×average of wheel diameters (actual values) of the front and rear wheels/tire diameter of the front or rear wheels (set value) (Expression 13)

The vehicle speed V, i.e., a ground speed of the vehicle body of the vehicle 1, is an average of the wheel speeds of the four wheels detected by the vehicle speed sensors.

Figure 10:
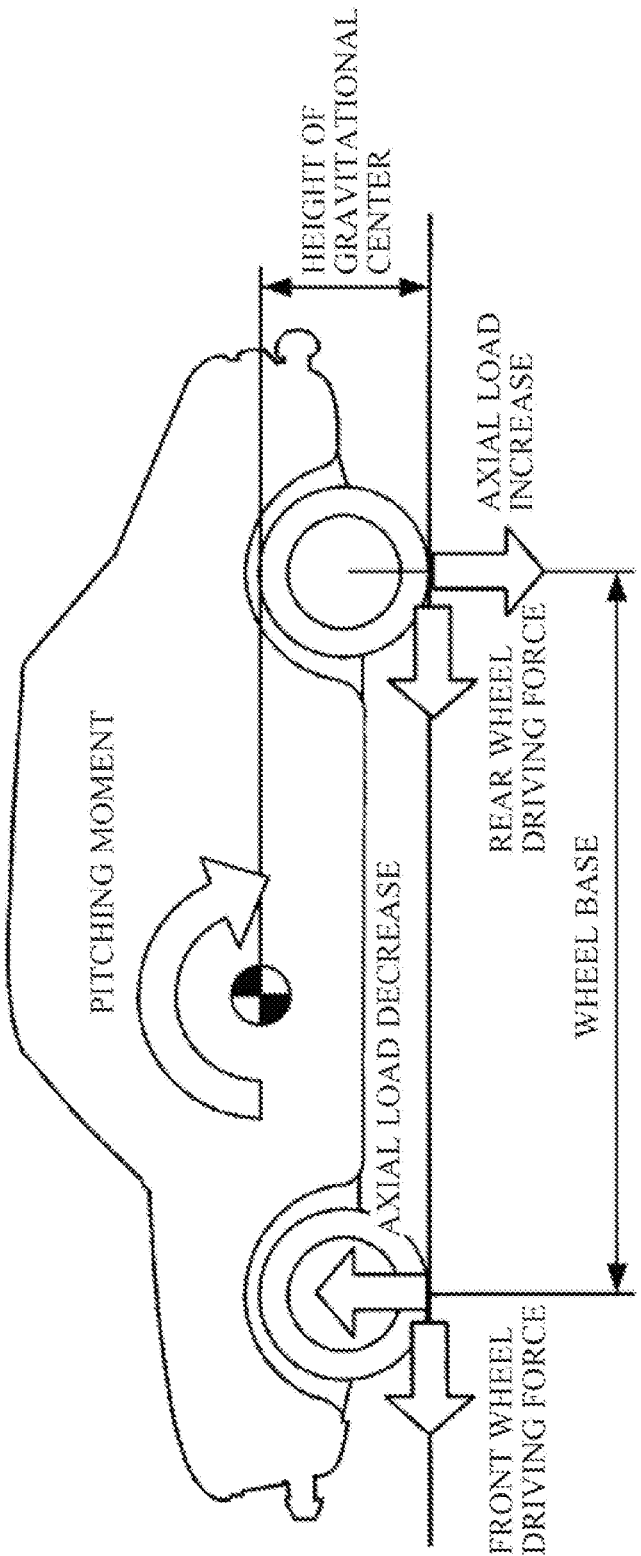
FIG. 10 is a diagram schematically illustrating a state in which a vehicle exhibits pitching behavior in a nose-up direction by acceleration.

FIG. 10 schematically illustrates a state in which a vehicle exhibits pitching behavior in a nose-up direction by acceleration.

On the occasion of acceleration, a pitching moment in the nose-up direction acts around the center of gravity CG, while an axial load of the front wheels FW decreases and an axial load of the rear wheels RW increases.

The longitudinal load shift ΔFz caused by acceleration or deceleration is expressed by the following Expression 14.

ΔFz=vehicle mass×longitudinal acceleration rate× height of the gravitational center/(2×wheel base) (Expression 14)

The vehicle mass, the height of the gravitational center, and the wheel base are constants unique to the vehicle.

It is possible to detect the longitudinal acceleration rate with the use of a longitudinal acceleration rate sensor.

The vertical loads Fzf and Fzr of the front and rear wheels are obtained by adding or subtracting the longitudinal load shift ΔFz mentioned above to or from a reference load, i.e., a vertical load at rest, and are expressed by the following Expressions 15 and 16.

$$Fzf = Fzf0 - \Delta Fzx \quad \text{(Expression 15)}$$

$$Fzr = Fzr0 + \Delta Fzx \quad \text{(Expression 16)}$$

Figure 11:
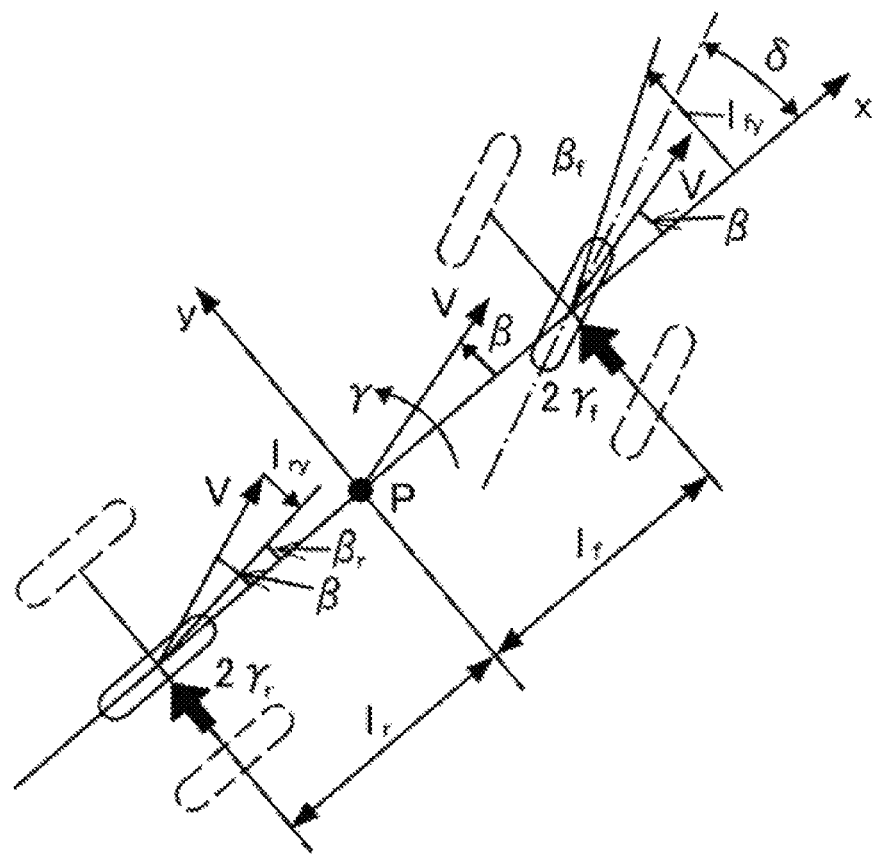
FIG. 11 is a diagram illustrating an example of an equivalent two-wheel model of a four-wheel automobile.

Fzf: vertical load of the front wheels
Fzr: vertical load of the rear wheels
Fzf0: vertical load of the front wheels at rest
Fzr0: vertical load of the rear wheels at rest
ΔFzx: amount of load shift caused by acceleration The amount of load shift ΔFzx caused by acceleration is expressed by the following Expression 17.

$$\Delta F_{zx} = \frac{m \cdot \ddot{x} \cdot h_g}{2 \cdot l} \quad \text{(Expression 17)}$$

m: vehicle mass
$\ddot{x}$: longitudinal acceleration rate
hg: height of the gravitational center
l: wheel base FIG. 11 illustrates an example of an equivalent two-wheel model of a four-wheel automobile.

The vehicle body slip angle β is expressed by the following Expression 18.

Vehicle body slip angle $\beta = ((1 - (\text{vehicle mass}$ (Expression 18)
$m/(2 \times \text{wheel base } 1)) \times (\text{distance } 1f \text{ between}$
the front shaft and the center of gravity/(distance
$1r$ between the rear shaft and the
center of gravity × cornering power
$Kr$ of the rear wheels)) × (vehicle speed
$V^2$)))/(1 + stability factor $A \times$ vehicle speed
$V^2$) × (distance $1r$ between the rear shaft
and the center of gravity/wheel base
$1$) × (steering wheel angle
$\theta H/$steering gear ration $n$)

The vehicle mass m, the distance lf between the front shaft and the center of gravity, the distance lr between the rear shaft and the center of gravity, the cornering power Kr of the rear wheels, the stability factor A, the wheel base l, and the steering gear ratio n are constants unique to the vehicle.

It is possible to acquire the vehicle speed V from the vehicle speed sensors, and the steering wheel angle θH from the steering angle sensor 133.

The vehicle body slip angle β is expressed by the following Expression 19.

$$\beta = \left(\frac{1 - \frac{m}{2 \cdot l} \frac{l_f}{l_r \cdot K_r} V^2}{1 - \frac{m}{2 \cdot l^2} \frac{l_f \cdot K_f - l_r \cdot K_r}{K_f \cdot K_r} V^2}\right) \frac{l_r}{l} \delta \quad \text{(Expression 19)}$$

$$= \frac{1 - \frac{m}{2 \cdot l} \frac{l_f}{l_r \cdot K_r} V^2}{1 + A \cdot V^2} \frac{l_r}{l} \delta$$

The ground speeds Vf and Vr of the front and rear shafts, i.e., the center positions of the right and left wheels, are expressed by the following Expressions 20 and 21.

The ground speeds Vf and Vr are obtained by adding or subtracting, to or from the vehicle speed V, a product of the distance lf or lr between the front or rear shaft and the center of gravity, the vehicle body slip angle β, and the yaw rate γ.

$$\begin{cases} V_f = V \cdot \frac{\rho + l_f \cdot \beta}{\rho} = V \cdot \frac{\left(\frac{V}{\gamma} + l_f \cdot \beta\right)}{\frac{V}{\gamma}} = \\ \quad V \cdot \left(1 + \frac{l_f \cdot \beta \cdot \gamma}{V}\right) = V + l_f \cdot \beta \cdot \gamma \\ V_r = V \cdot \frac{\rho - l_r \cdot \beta}{\rho} = V \cdot \frac{\left(\frac{V}{\gamma} - l_r \cdot \beta\right)}{\frac{V}{\gamma}} = \\ \quad V \cdot \left(1 - \frac{l_r \cdot \beta \cdot \gamma}{V}\right) = V - l_r \cdot \beta \cdot \gamma \end{cases} \quad \text{(Expressions 20 and 21)}$$

Vf: road surface speed of a grounding point of a front wheel tire [m/s]
Vr: road surface speed of a grounding point of a rear wheel tire [m/s]
ρ: radius of cornering of a point of the center of gravity [m]
γ: yaw rate [rad/s]

The slip angles αf and αr of the front and rear wheels are expressed by the following Expressions 22 and 23.

α*f*=steering wheel angle θ*H*/steering gear ratio *n*–vehicle body slip angle β–distance *lf* between the front shaft and the center of gravity×yaw rate γ/vehicle speed *V* (Expression 22)

α*r*=–vehicle body slip angle β–distance *lr* between the rear shaft and the center of gravity×yaw rate γ/vehicle speed *V* (Expression 23)

The front wheel steering angle δf is expressed by the following Expression 24.

δ*f*=θ*H*/*n* (Expression 24)

The slip angles αf and αr of the front and rear wheels are expressed by the following Expressions 25 and 26.

$$\begin{cases} \alpha_f = \delta_f - \beta - \frac{l_f \cdot \gamma}{V} \\ \alpha_r = -\beta + \frac{l_r \cdot \gamma}{V} \end{cases} \quad \text{(Expressions 25 and 26)}$$

αf: slip angle of the front wheels [rad]
αr: slip angle of the rear wheels [rad]
δf: front wheel steering angle [rad]
β: vehicle body slip angle [rad]
lf: distance between the front shaft and the center of gravity [m]
lr: distance between the rear shaft and the center of gravity [m]
γ: yaw rate [rad/s]
V: vehicle speed [m/s]

The free rolling speeds Vf_free and Vr_free of the front wheels FW and the rear wheels RW are expressed by the following Expressions 27 and 28.

$$\begin{cases} V_{f\_free} = V_f \cdot \cos(\alpha_f) \\ V_{r\_free} = V_r \cdot \cos(\alpha_r) \end{cases} \quad \text{(Expressions 27 and 28)}$$

The slip rates λ, i.e., the slip rates λf and λr, of the front wheels FW and the rear wheels RW are expressed by the following Expressions 29 and 30.

$$\lambda = \begin{cases} \dfrac{V_R\cos\alpha - V_B}{V_R\cos\alpha} \geq 0 & \text{(in braking)} \\ \dfrac{V_R\cos\alpha - V_B}{V_B} < 0 & \text{(in driving)} \end{cases} \quad \text{(Expressions 29 and 30)}$$

λ: slip rate
VR: speed of the road surface=Vf_free, Vr_free
VB: average speed of the tread base in the ground plane The driving stiffnesses Kxf and Kxr of the front wheels FW and the rear wheels RW are expressed by the following Expression 31. The driving stiffnesses are substantially equal to the braking stiffnesses.

$Kxf, Kxr = AX$(the driving stiffness/reference (Expression 31)

$Mvalue$ of the vertical load (when constant: $\alpha = 0$) × vertical load $Fzf, Fzr$ of the front or rear wheels × cos($rBx1$(model constant) × $A\tan(tKxf, tKxr)$ = $rBx1(MFconstant) \times \cos$ ($A\tan(rBx2$(model constant) × slip rate (constant: 0.01))) × slip angle $\alpha f$, $\alpha r$ of the front or rear wheels The model constants mentioned above are constants to be used in calculation with a numerical calculation model of a tire.

As such a numerical calculation model of a tire, for example, Magic Formula (MF) may be used.

The driving forces FxDf and FxDr of the front wheels FW and the rear wheels RW calculated from the tire slip rates are expressed by the following Expression 32.

Driving force $FxDf, FxDr$=driving stiffness $Kxf, Kxr$
of the front wheels $FW$ or the rear wheels
$RW$×slip rate $\lambda f, \lambda r$ of the front wheels $FW$ or
the rear wheels $RW$×100    (Expression 32)

Here, the driving stiffnesses Kxf and Kxr of the front wheels FW and the rear wheels RW vary with the tire slip angles.

Figure 12:
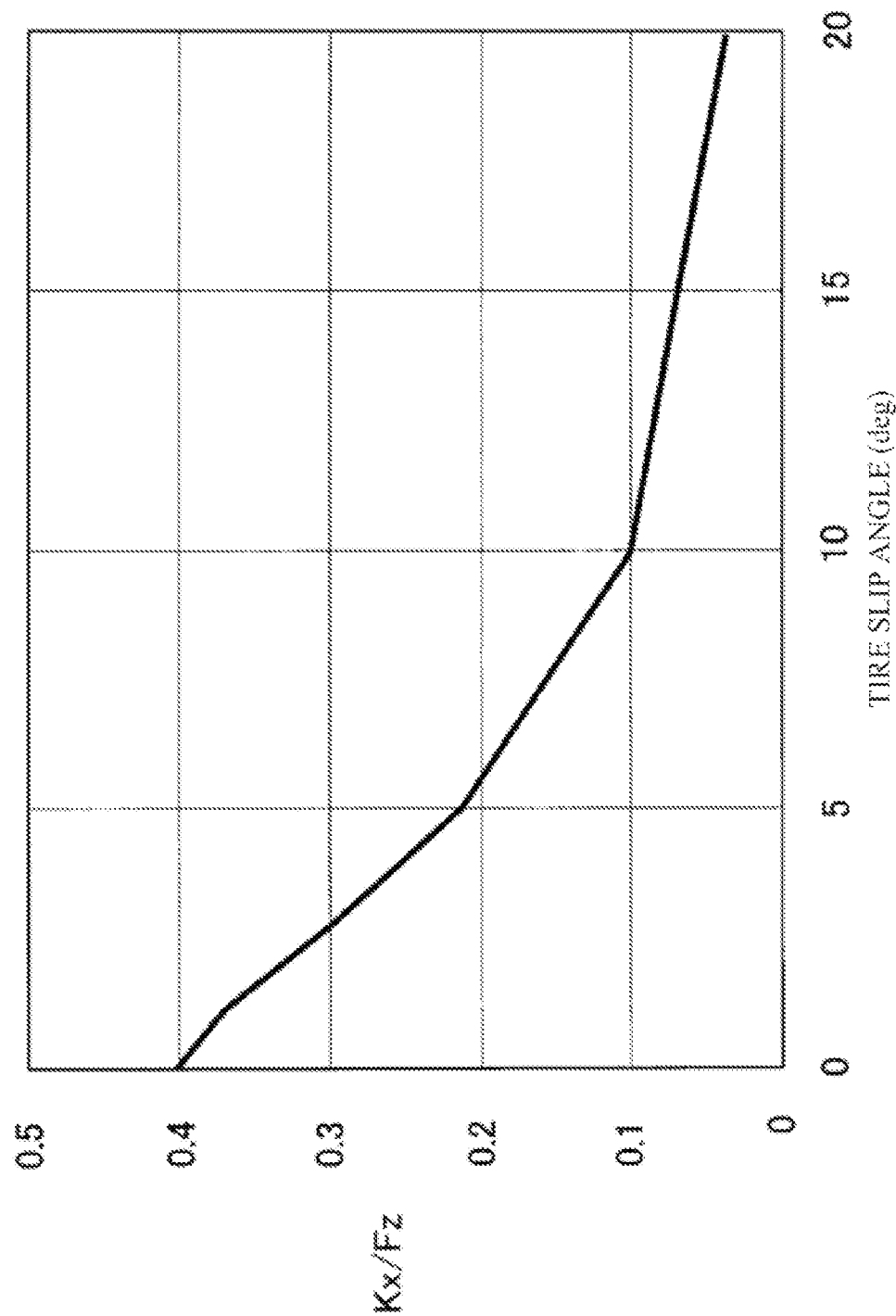
FIG. 12 is a diagram illustrating correlation between a tire slip angle and a value obtained by dividing the driving stiffness by a tire vertical load.

FIG. 12 illustrates correlation between the tire slip angle and a value obtained by dividing the driving stiffness by a tire vertical load.

The horizontal axis represents the tire slip angle αf or αr, and the vertical axis represents the value obtained by dividing the driving stiffness Kxf or Kxr by the vertical load Fz.

As illustrated in FIG. 12, when the vertical load Fz is equivalent, i.e., when the denominator of the vertical axis is constant, the driving stiffnesses Kxf and Kxr decrease as the tire slip angles αf and αr increase.

Thus, in calculating the driving forces, it is necessary to use the driving stiffnesses Kxf and Kxr corresponding to the tire slip angles αf and αr calculated from the vehicle model.

The front and rear wheel driving forces FxLf and FxLr assuming that the transfer clutch 40 is locked are expressed by the following Expression 33.

$FxLf, FxLr$ = (total driving force distributed (Expression 33)

between the front and rear wheels by the ratio of the driving stiffnesses + the front or rear wheel driving force)((total driving force $FxEG$ × final reduction ratio/tire diameter (actual value) of the front or rear wheels) – (front wheel driving force $FxDf$ + rear wheel driving force $FxDr$) × driving stiffness $Kxf, Kxr$ of the front or rear wheels/(driving stiffness $Kxf$ of the front wheels + driving stiffness $Kxr$ of the rear wheels) + front or rear wheel driving force $FxDf$, $FxDr$ The lock/slip rate TRFΔVω of the transfer clutch 40 is expressed by the following Expression 34.

$TRF\Delta V\omega$ = MIN(MAX(((front shaft   (Expression 34)

rotation speed $Vtf$ – rear shaft rotation speed $Vtr$) – (front wheel free rolling speed Vf_free – rear wheel free rolling speed Vr_free))/MAX(ABS(front shaft rotation speed $Vtf$ – rear shaft rotation speed, lower limit(zero–division prevention constant)), lower limit: – 1), upper limit: 1)

Figure 13:
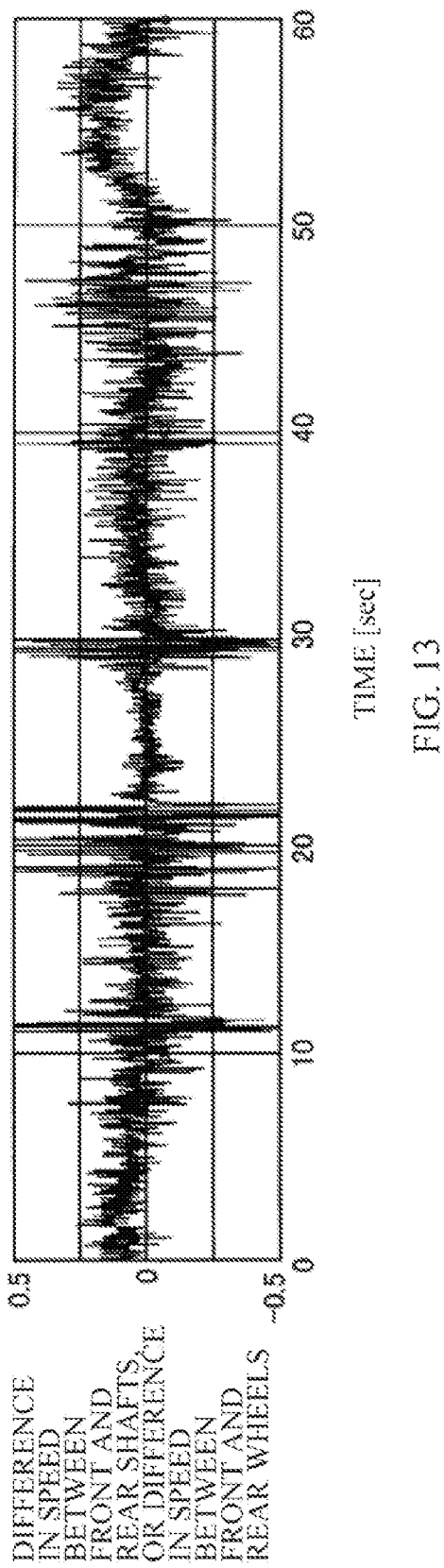
FIG. 13 is a diagram illustrating an example of a measurement result of a difference in an actual rotation speed between front and rear shafts of a transfer clutch.

FIG. 13 illustrates an example of a measurement result of a difference in an actual rotation speed between the front and rear shafts of the transfer clutch.

The horizontal axis represents time, and the vertical axis represents a difference in the rotation speed between the front shaft and the rear shaft of the transfer clutch 40, i.e., between the side on which the front wheel driving force transmission mechanism 30 is disposed, and the side on which the rear wheel driving force transmission mechanism 50 is disposed. This value indicates a difference in an actual rotation speed between the front wheels and the rear wheels.

As illustrated, in an actual vehicle, significant vibrations are observed in the differential rotation between the front and rear shafts of the transfer clutch 40.

In the expression described above, the denominator of the division is set to the difference in the actual rotation speed between the wheels having the same vibrations as the numerator. Hence, it is possible to suppress an amplitude of a calculated value of the lock/slip rate TRFΔVω of the transfer clutch 40 even when there are significant vibrations of the differential rotation between the front shaft and the rear shaft.

When the transfer clutch 40 is in the locked state, the lock/slip rate TRFΔVω exhibits vibrations of 0 to ±1 on average.

Here, the lock/slip rate TRFΔVω being a positive value indicates that the difference in the peripheral speed between the front and rear shafts is larger than the difference in the free rolling speed, and indicates that the driving force distribution is biased to the front shaft, i.e., in a tendency close to a front wheel drive (FWD) vehicle.

The lock/slip rate TRFΔVω being a negative value indicates that the difference in the peripheral speed between the front and rear shafts is smaller than the difference in the free rolling speed, and indicates that the driving force distribution is biased to the rear shaft, i.e., in a tendency close to a rear wheel drive (RWD) vehicle.

It is to be noted that the lock/slip rate TRFΔVω also exhibits the vibrations of 0 to ±1 on average when the transfer clutch 40 is released and the total driving force equals to 0 (=0). However, in accordance with an increase in the total driving force, the lock/slip rate TRFΔVω has vibration values with an average being offset in a positive direction when the front wheels are the main driving wheels, and in a negative direction when the rear wheels are the main driving wheels.

Transfer torque, i.e., a driving force conversion value, Ftrf is a value to subtract a transmission force of the transfer clutch 40, i.e., the driving force, from the braking force of the rear shaft in accordance with a degree of positivity of the lock/slip rate TRFΔVω described above.

When the slip rate λf of the front wheels is larger than the slip rate λr of the rear wheels (λf>λr), the transfer torque Ftrf is expressed by the following Expression 35.

$$Ftrf = -\text{lock/slip rate } TRF\Delta V\omega \text{ of the} \quad \text{(Expression 35)}$$
$$\text{transfer clutch } 40 \times \text{rear wheel driving force}$$
$$FxLr \text{ assuming that transfer clutch 40 is locked}$$

Otherwise, the transfer torque Ftrf equals to 0 (Ftrf=0).

The front wheel driving force FxDf considering the locked state or the slip state of the transfer clutch 40 is a value obtained by subtracting the transfer torque, i.e., the driving force conversion value, Ftrf from the front shaft driving force FxLf assuming that the transfer clutch 40 is locked.

The rear wheel driving force FxDr considering the locked state or the slip state of the transfer clutch 40 is a value obtained by adding the transfer torque, i.e., the driving force conversion value, Ftrf to the rear shaft driving force FxLr assuming that the transfer clutch 40 is locked.

Figure 14:
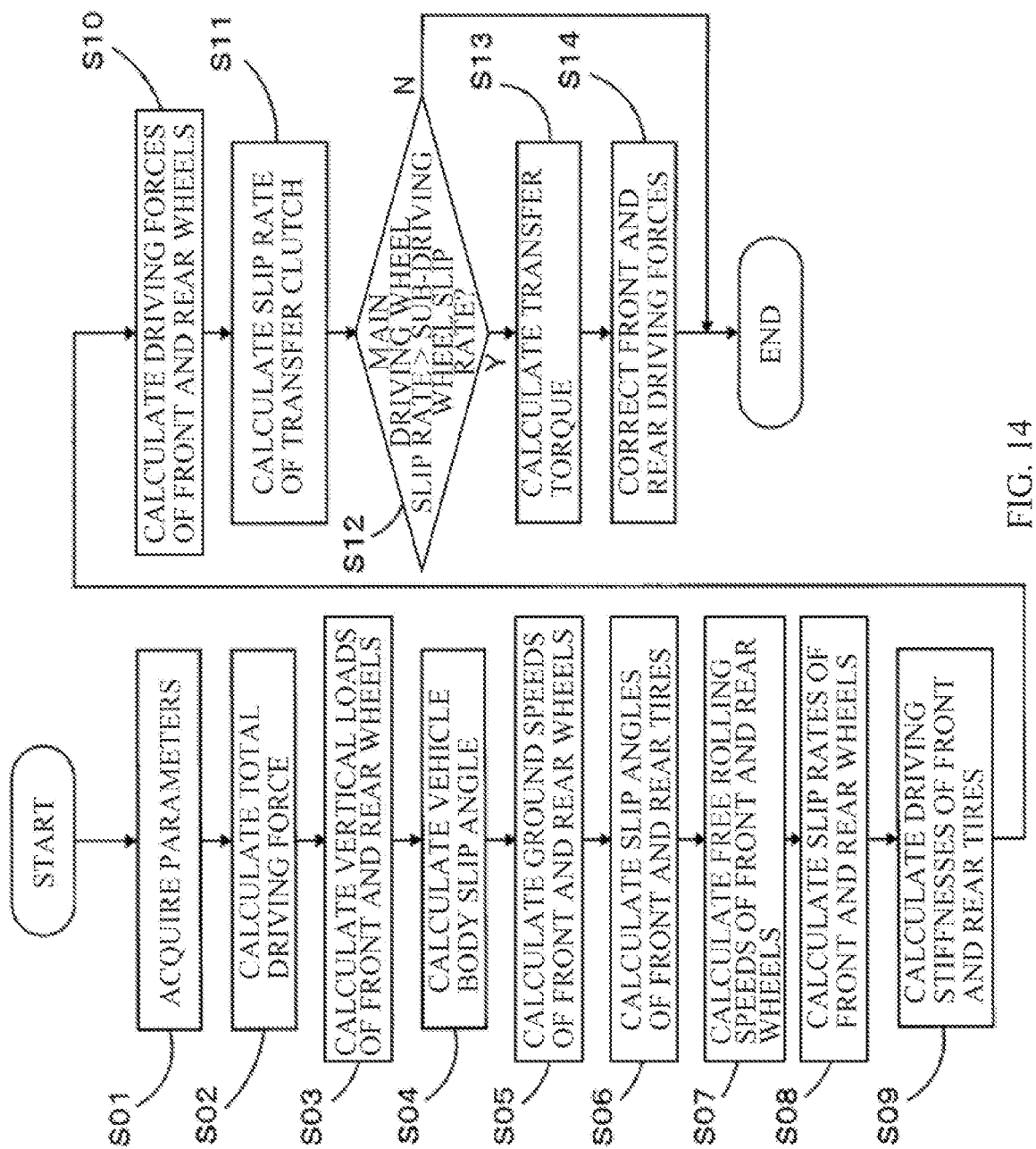
FIG. 14 is a flowchart of driving force estimation processing in the embodiment.

FIG. 14 is a flowchart illustrating driving force estimation processing in the first embodiment.

In the following, description is given in the order of steps.

<Step S01: Acquire Parameters>

The driving force distribution control unit 130 may acquire, by communication, values other than the constants out of the parameters to be involved in the driving force estimation described above, from each sensor or from other units.

Thereafter, the flow may be allowed to proceed to step S02.

<Step S02: Calculate Total Driving Force>

The driving force distribution control unit 130 may calculate the total driving force FxEG of the front wheels FW and the rear wheels RW with the use of Expression 11 described above.

Thereafter, the flow may be allowed to proceed to step S03.

<Step S03: Calculate Vertical Loads of Front and Rear Wheels>

The driving force distribution control unit 130 may calculate the vertical loads Fzf and Fzr of the front wheels FW and the rear wheels RW with the use of Expressions 15 to 17 described above.

Thereafter, the flow may be allowed to proceed to step S04.

<Step S04: Calculate Vehicle Body Slip Angle>

The driving force distribution control unit 130 may calculate the vehicle body slip angle β with the use of Expressions 18 and 19 described above.

Thereafter, the flow may be allowed to proceed to step S05.

<Step S05: Calculate Ground Speeds of Front and Rear Wheels>

The driving force distribution control unit 130 may calculate the ground speeds Vf and Vr of the front wheels FW and the rear wheels RW with the use of Expressions 20 and 21 described above.

Thereafter, the flow may be allowed to proceed to step S06.

<Step S06: Calculate Slip Angles of Front and Rear Tires>

The driving force distribution control unit 130 may calculate the slip angles αf and αr of the front wheels FW and the rear wheels RW on the occasion of cornering, etc., with the use of Expressions 25 and 26 described above.

Thereafter, the flow may be allowed to proceed to step S07.

<Step S07: Calculate Free Rolling Speeds of Front and Rear Wheels>

The driving force distribution control unit 130 may calculate the free rolling speeds Vf_free and Vr_free of the front wheels FW and the rear wheels RW with the use of Expressions 27 and 28 described above.

Thereafter, the flow may be allowed to proceed to step S08.

<Step S08: Calculate Slip Rates of Front and Rear Wheels>

The driving force distribution control unit 130 may calculate the slip rates λ, i.e., the slip rates λf and λr, of the front wheels FW and the rear wheels RW with the use of Expressions 29 and 30 described above.

Thereafter, the flow may be allowed to proceed to step S09.

<Step S09: Calculate Driving Stiffnesses of Front and Rear Tires>

The driving force distribution control unit 130 may calculate the driving stiffnesses Kxf and Kxr of the front wheels FW and the rear wheels RW with the use of Expression 31 described above.

Thereafter, the flow may be allowed to proceed to step S10.

<Step S10: Calculate Driving Forces of Front and Rear Wheels>

The driving force distribution control unit 130 may calculate the driving forces FxDf and FxDr of the front wheels FW and the rear wheels RW assuming that the transfer clutch 40 is in the locked state, with the use of Expression 32 described above.

At this occasion, as the driving stiffnesses Kxf and Kxr to be used in the calculation, the corrected values in accordance with the slip angles αf and αr of the front wheels FW and the rear wheels RW obtained in step S06 are used.

Thereafter, the flow may be allowed to proceed to step S11.

<Step S11: Calculate Slip Rate of Transfer Clutch>

The driving force distribution control unit 130 may calculate the lock/slip rate TRFΔVω of the transfer clutch 40 with the use of Expression 34 described above.

Thereafter, the flow may be allowed to proceed to step S12.

<Step S12: Compare Slip Rates of Main Driving Wheels and Sub-Driving Wheels>

The driving force distribution control unit 130 may compare the slip rate λf of the front wheels FW as the main driving wheels, with the slip rate λr of the rear wheels RW as the sub-driving wheels. When the former is larger than the latter, the driving force distribution control unit 130 may assume that the transfer clutch 40 is in the slip state, and cause the flow to proceed to step S13. Otherwise, the driving force distribution control unit 130 may assume that the transfer clutch 40 is in the locked state, and end the series of processing.

<Step S13: Calculate Transfer Torque>

The driving force distribution control unit 130 may calculate the transfer torque Ftrf with the use of Expression 35 described above.

Thereafter, the flow may be allowed to proceed to step S14.

<Step S14: Correct and Calculate Front and Rear Driving Forces>

The driving force distribution control unit 130 may subtract the transfer torque, i.e., the driving force conversion value, Ftrf obtained in step S13 from the driving force FxDf of the front wheels FW obtained in step S10.

Moreover, the driving force distribution control unit 130 may add the transfer torque Ftrf obtained in step S13 to the driving force FxDr of the rear wheels RW obtained in step S10.

Thereafter, the series of processing may be ended.

Figure 15:
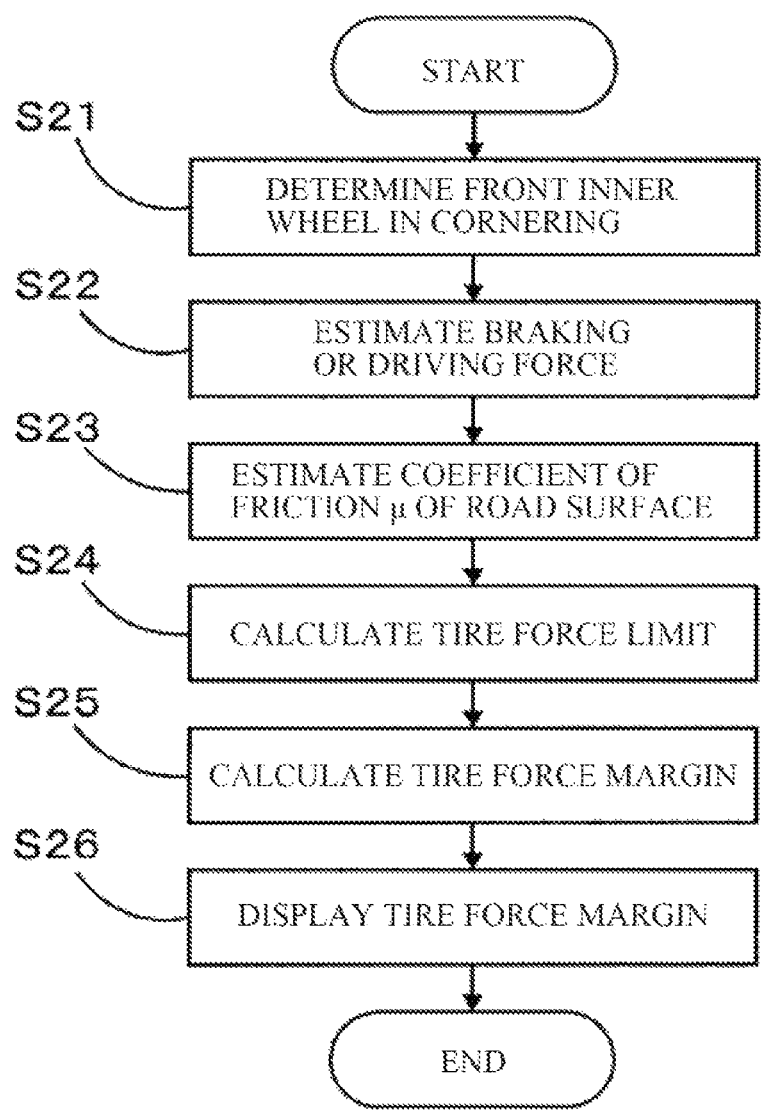
FIG. 15 is a flowchart of operation of calculating a tire force margin in the driver assistance apparatus according to the embodiment.

FIG. 15 is a flowchart illustrating operation of calculating the tire force margin in the driver assistance apparatus in the first embodiment.

In the following, description is given in the order of steps.

<Step S21: Determine Front Inner Wheel in Cornering>

When the vehicle enters a cornering state, the driver assistance control unit 150 may determine which of the left and right front wheels FW is the front inner wheel in cornering.

It is possible to determine the front inner wheel in cornering based on, for example, a steering angle of the steering device, the lateral acceleration rate acting on the vehicle body, and the yaw rate of the vehicle body, without limitation.

Thereafter, the flow may be allowed to proceed to step S22.

<Step S22: Estimate Braking or Driving Force>

The driving force distribution control unit 130 may estimate the braking or driving force, i.e., the braking force or the driving force, acting on the left and right front wheels FW by the method described above.

The estimated braking or driving force may be transmitted to the driver assistance control unit 150.

Thereafter, the flow may be allowed to proceed to step S23.

<Step S23: Estimate Road Surface Friction Coefficient μ>

The tire force margin calculator 151 of the driver assistance control unit 150 may estimate the coefficient of friction μ of the road surface on which the vehicle is currently traveling.

For example, a wet condition of the road surface may be detected with the use of an optical sensor such as a camera. When the road surface is a dry paved road surface, the coefficient of friction μ may be estimated as 1.0 (μ=1.0). When the road surface is a wet paved road surface, the coefficient of friction μ may be estimated as 0.65 (μ=0.65).

Other known techniques may be used to estimate the coefficient of friction of the road surface.

Thereafter, the flow may be allowed to proceed to step S24.

<Step S24: Calculate Tire Force Limit>

The tire force margin calculator 151 of the driver assistance control unit 150 may calculate the tire force limit Fmax by using Expression 1 described above.

Thereafter, the flow may be allowed to proceed to step S25.

<Step S25: Calculate Tire Force Margin>

The tire force margin calculator 151 of the driver assistance control unit 150 may calculate the tire force current value F by using Expression 4 described above. The tire force margin calculator 151 may subtract, from 1, the value obtained by dividing the tire force current value F by the tire force limit Fmax obtained in step S24, to calculate the tire force margin.

Thereafter, the flow may be allowed to proceed to step S26.

<Step S26: Display Tire Force Margin>

The driver assistance control unit 150 may allow the display unit 160 to display the information regarding the tire force margin calculated in step S25, and present the driver with the information.

Thereafter, the series of processing may be ended.

Non-limiting examples of the display modes of the tire force margin are described in detail later.

When the tire force margin of the front inner wheel in cornering declines, i.e., when the value of the tire force margin approaches zero (0) and the tire force approaches the limit, the driver assistance control unit 150 may present the driver with the driving operation command that causes the restoration of the tire force margin, with the use of the display unit 160.

Figure 16:
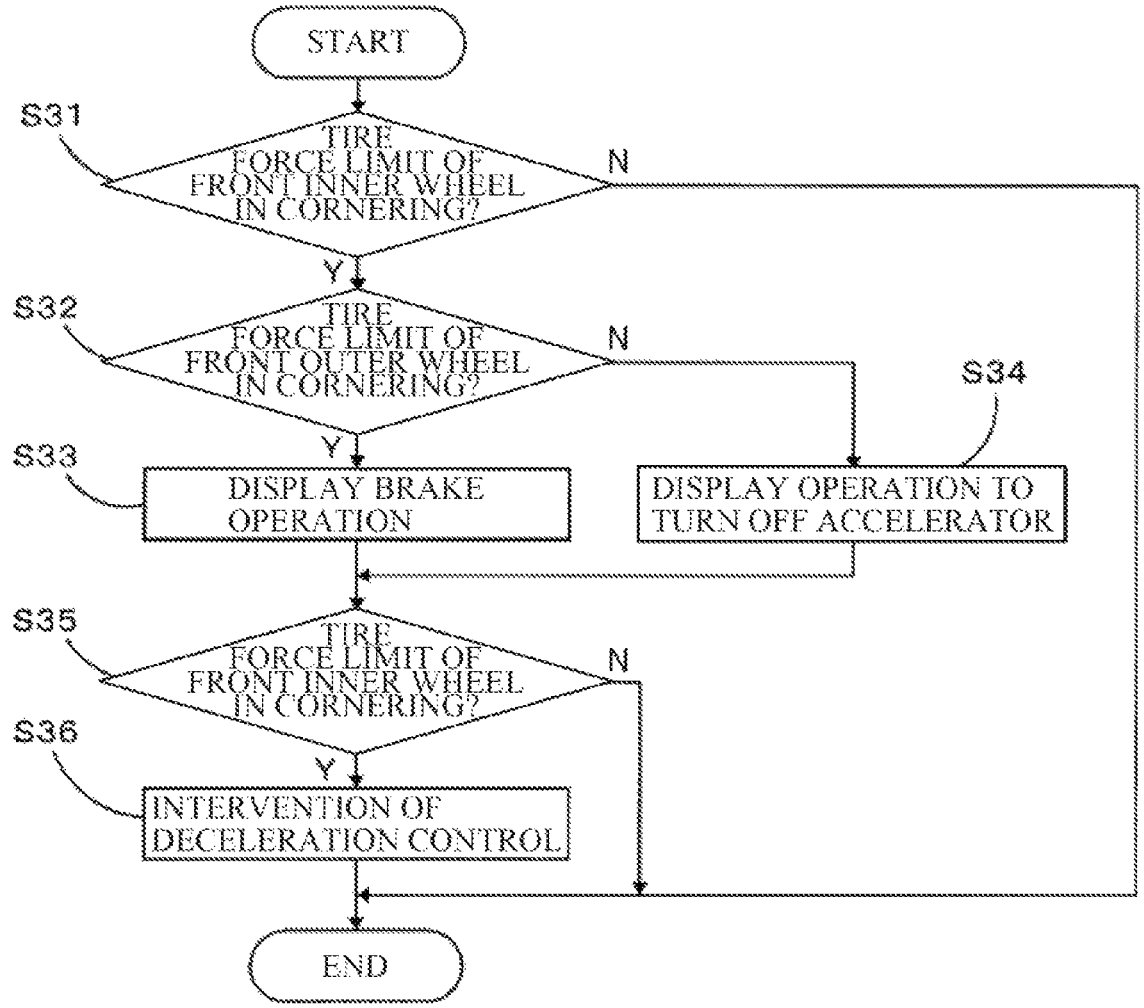
FIG. 16 is a flowchart of operation of outputting a driving operation command in a driver assistance control unit.

FIG. 16 is a flowchart illustrating operation of outputting the driving operation command in the driver assistance control unit.

In the following, description is given in the order of steps.

<Step S31: Determine Tire Force Limit of Front Inner Wheel in Cornering>

The driving operation command outputter 152 of the driver assistance control unit 150 may determine whether or not the tire force margin of the front inner wheel in cornering is equal to or smaller than a predetermined threshold value.

The threshold value may be set to, for example, near zero (0).

When the tire force margin is equal to or smaller than the threshold value, the flow may be allowed to proceed to step S32, assuming that the tire force of the front inner wheel in cornering is close to the limit, and it is difficult to further increase the tire force.

Otherwise, the series of processing may be ended, assuming that it is unnecessary to present the driver with the driving operation command.

<Step S32: Determine Tire Force Limit of Front Outer Wheel in Cornering>

The driving operation command outputter 152 may determine whether or not a tire force margin of a front outer wheel in cornering is equal to or smaller than the predetermined threshold value.

When the tire force margin of the front outer wheel in cornering becomes equal to or smaller than the threshold value, the flow may be allowed to proceed to step S33, assuming a severe condition that the tire force of the front outer wheel in cornering is close to the limit.

Otherwise, the flow may be allowed to proceed to step S34, assuming relatively less severe condition.

<Step S33: Display Brake Operation>

The driving operation command outputter 152 may output a brake operation as the driving operation command that causes the restoration of the tire force margin of the front inner wheel in cornering.

The driver assistance control unit 150 may allow the display unit 160 to provide display prompting the driver to make the brake operation.

Thereafter, the flow may be allowed to proceed to step S35.

<Step S34: Display Operation to Turn Off Accelerator>

The driving operation command outputter 152 may output an operation to turn off an accelerator as the driving operation command that causes the restoration of the tire force margin of the front inner wheel in cornering.

The driver assistance control unit 150 may allow the display unit 160 to provide display prompting the driver to make the operation to turn off the accelerator.

Thereafter, the flow may be allowed to proceed to step S35.

<Step S35: Determine Tire Force Limit of Front Inner Wheel in Cornering>

The driving operation command outputter 152 may determine again whether or not the tire force margin of the front inner wheel in cornering is equal to or smaller than the predetermined threshold value.

When the tire force margin of the front inner wheel in cornering is still equal to or smaller than the threshold value, the flow may be allowed to proceed to step S36, assuming that the tire force margin has not yet been restored even by the display provided in step S33 or S34.

Otherwise, the series of processing may be ended, assuming that the tire force margin has been restored.

<Step S36: Intervention of Deceleration Control>

The driver assistance control unit 150 may give a command to an unillustrated braking control device, to cause intervention of a deceleration control. The unillustrated braking control device may control the braking force of a brake device of the vehicle. The unillustrated braking control device may include, for example, a hydraulic control unit configured to control brake hydraulic pressure of a hydraulic service brake. The deceleration control includes generating the braking force by the brake device.

Thereafter, the series of processing may be ended.

In the flowchart illustrated in FIG. 16, as the driving operation coping with the decline in the tire force margin, the operation to turn off the accelerator and the brake operation are adopted. However, instead of these operations or together with these operations, an operation to reduce the steering angle, i.e., an operation to turn back the steering wheel, may be adopted.

Making such an operation to reduce the steering angle makes it possible to reduce the tire slip angle, and reduce the lateral force Fy, leading to improvement of the decline in the tire force margin.

Figure 17:
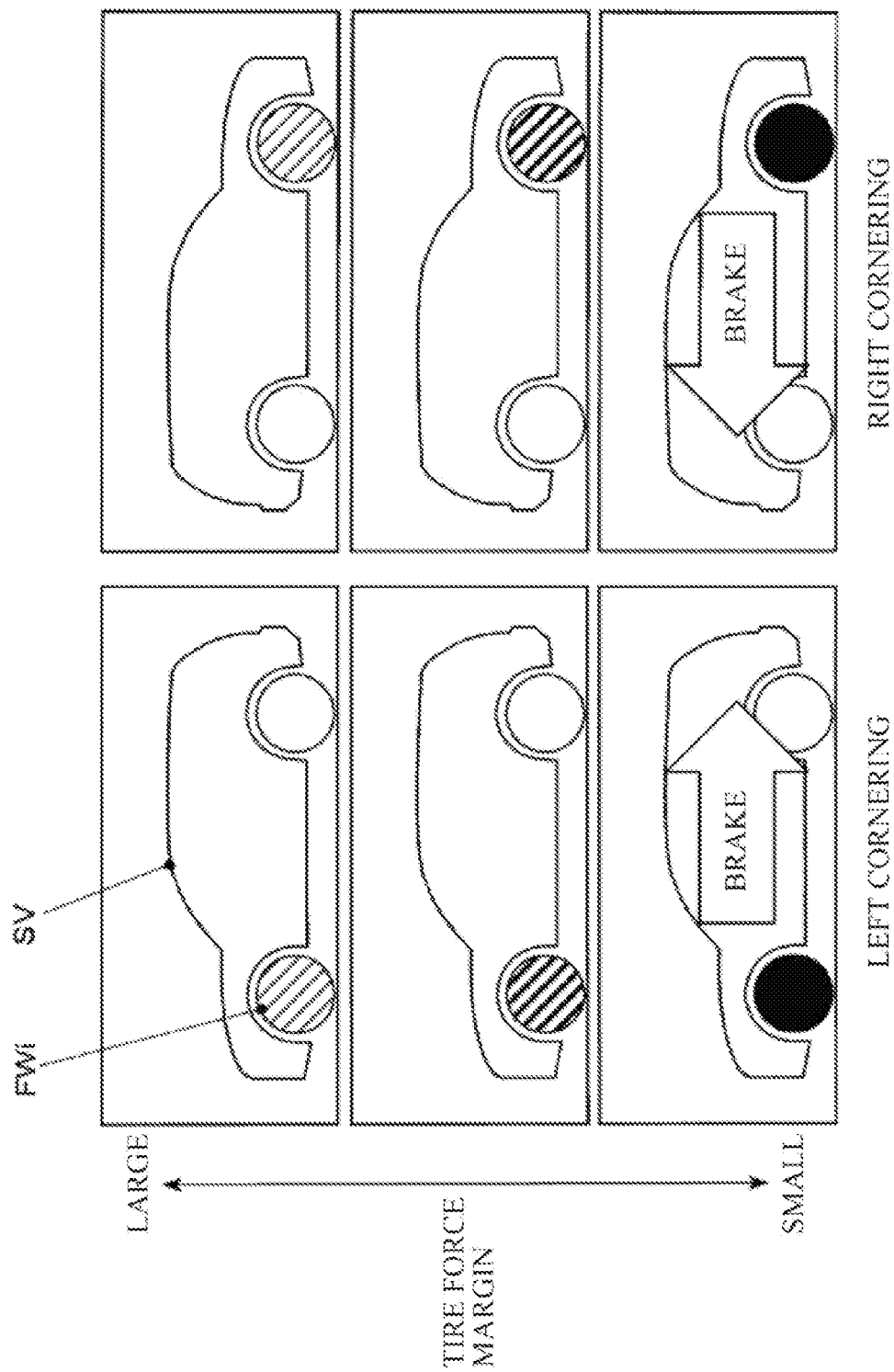
FIG. 17 is a diagram illustrating an example of image display in the driver assistance apparatus according to the embodiment.

FIG. 17 illustrates an example of image display in the driver assistance apparatus according to the first embodiment.

In FIG. 17, a display mode in left cornering is illustrated on the left, while a display mode in right cornering is illustrated on the right.

In both left and right cornering, the tire force margin becomes larger as goes upward, while the tire force margin becomes smaller as goes downward.

In the example illustrated in FIG. 17, a side view SV of the vehicle as viewed from inner side of cornering is displayed by, for example, illustration. The illustration provides color-coded display of the tire force margin by coloring of the front inner wheel FWi in cornering.

In the coloring of the front inner wheel in cornering, the front inner wheel may be gradually dark-colored in accordance with the decline in the tire force margin. Alternatively, the front inner wheel in cornering may be in a color tone that attracts attention, e.g., yellowish colors and reddish colors.

The lowermost state indicates a case where the tire force margin of the front inner wheel in cornering is tight, e.g., a case where the tire force margin of the front inner wheel in cornering is equal to or smaller than the predetermined threshold value. Thus, in the lowermost state, the driving operation command prompting the driver to make the braking operation is also displayed.

Figure 18:
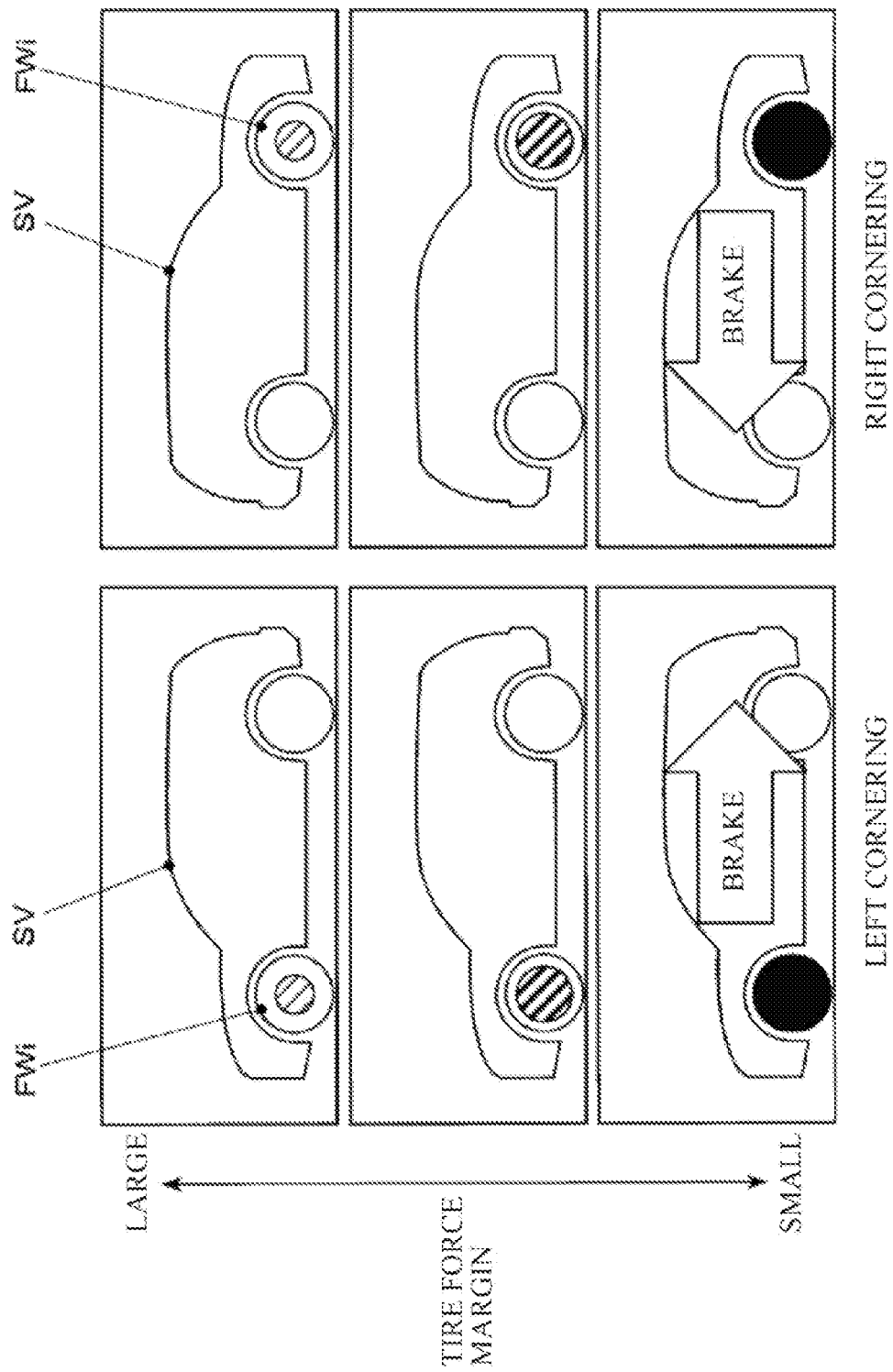
FIG. 18 is a diagram illustrating another example of the image display in the driver assistance apparatus according to the embodiment.

FIG. 18 illustrates another example of the image display in the driver assistance apparatus according to the first embodiment.

In the example illustrated in FIG. 18, the tire force margin of the front inner wheel in cornering is displayed in size-coding of the colored portion in addition to the color-coding similar to FIG. 17.

In one example, a circle is displayed in superimposition on the front inner wheel in cornering. The circle is displayed in the same color as the front wheel in FIG. 17, and the size of the circle is enlarged and displayed in accordance with the decline in the tire force margin.

FIGS. 19A and 19B illustrate other examples of the image display in the driver assistance apparatus of the first embodiment.

In the examples illustrated in FIGS. 19A and 19B, the steering angle of the steering device is displayed by illustration of a steering wheel SW as viewed from the front.

Around the illustration of the steering wheel SW, an arcuate bar graph G is displayed. The arcuate bar graph G is arranged along the upper half of the steering wheel SW.

In the bar graph G, the tire force margin of the front inner wheel in cornering is displayed.

The display of the bar graph G extends in a direction of cornering in accordance with an increase in the tire force current value.

A side edge of a display range of the bar graph G indicates the tire force limit.

The display of the bar graph G reaching the side edge means that the tire force margin has become zero (0), i.e., that the tire force current value matches the tire force limit.

The example in FIG. 19A illustrates a state in which the tire force margin is relatively large.

In contrast, in the example in FIG. 19B, the tire force margin is tight. Thus, an arrow-shaped mark is displayed as the driving operation command to prompt the driver to reduce the steering angle, in superimposition on the illustration of the steering wheel SW.

FIGS. 20A and 20B illustrate other examples of the image display in the driver assistance apparatus of the first embodiment.

In the examples illustrated in FIGS. 20A and 20B, the tire force current value F is displayed as an arrow indicating a vector, in superimposition on a friction circle indicating the tire force limit Fmax. A vertical size of the arrow indicating the vector indicates the braking and driving force Fx, and a horizontal size of the arrow indicates the lateral force Fy.

Moreover, in a lower part of the friction circle, illustration of an accelerator pedal Pa and a brake pedal Pb is displayed.

The example in FIG. 20A illustrates a case where the driver has made an operation to turn on the accelerator.

In this case, when the tire force current value F approaches the tire force limit Fmax and the tire force margin declines, display of "OFF" is provided in superimposition on the illustration of the accelerator pedal Pa to prompt the driver to turn off the accelerator.

The example in FIG. 20B illustrates a case where the driver has turned off the accelerator.

In this case, when the tire force margin declines, display of "ON" is provided in superimposition on the illustration of the brake pedal Pb to prompt the driver to turn on the brake.

According to the first embodiment described above, it is possible to obtain the following effects.

(1) On the occasion of cornering, the front inner wheel in cornering tends to have the severest tire force margin. When the tire force margin of the front inner wheel in cornering declines and the tire force approaches the limit, the driver is presented with the driving operation command that causes the restoration of the tire force margin. Hence, it is possible to suppress the tire force margin of the front inner wheel in cornering from further decreasing and suppress the tire force current value from reaching the tire force limit. This leads to suppression of instable behavior of the vehicle.

(2) Together with the information regarding the driving operation command, the information regarding the tire force margin may be presented. Hence, it is possible to sense in advance that the tire force margin is tight, prior to the presentation of the information regarding the driving operation command.

(3) In accordance with the decline in the tire force margin of the front inner wheel in cornering, the driving operation command may be presented. The driving operation command includes one or more of the decrease in the driving force, the increase in the braking force, and the decrease in the steering angle of the front wheels. Hence, it is possible to appropriately restore, or increase, the tire force margin by the decrease in the tire force current value, or by the decrease in the lateral acceleration rate, i.e., the decline in the tire lateral force. The decrease in the tire force current value is caused by the decrease in the driving force or the decrease in the steering angle of the front wheels. The decrease in the lateral acceleration rate accompanies the deceleration of the vehicle. The lateral acceleration rate is a centripetal acceleration rate in cornering.

(4) The content of the driving operation command may be made to differ in accordance with the tire force margin of the front outer wheel in cornering. The driving operation command is presented in accordance with the decline in the tire force margin of the front inner wheel in cornering. Thus, the appropriate driving operation command is presented in accordance with whether the tire force margin is tight solely with respect to the front inner wheel in cornering, or whether the tire force margin is also tight at the same time with respect to the front outer wheel in cornering. Hence, it is possible to maintain the tire force margin of each wheel in an appropriate state, leading to suppression of an instable state of the vehicle.

(5) When the tire force margin of the front inner wheel in cornering is not restored ever if the driving operation command is presented to the driver, an automatic deceleration may be made by the intervention of the braking control. Hence, it is possible to suppress the tire force of the front inner wheel in cornering from reaching the limit even when the driver's operation is insufficient. In this case, it is unnecessary for the driver to make the brake operation, leading to reduction in a burden for the driver.

Second Embodiment

Description is given next of a driver assistance apparatus according to a second embodiment of the disclosure.

In each embodiment described below, similar elements to those of the forgoing embodiment are denoted by the same reference characters, and description thereof is omitted. Description is given mainly of differences.

The driver assistance apparatus of the second embodiment is configured to present the driving operation that causes the restoration of the tire force margin of the front inner wheel in cornering, not only to a driver of a subject vehicle, or a preceding vehicle, but also to a driver of a following vehicle traveling behind the subject vehicle in the same direction as the subject vehicle.

FIG. 21 schematically illustrates a system configuration of the driver assistance apparatus of the second embodiment.

A preceding vehicle V1 and a following vehicle V2 may each have a similar hardware configuration to that of the vehicle 1 of the first embodiment.

The preceding vehicle V1 and the following vehicle V2 may each include a communication device 170. The communication device 170 is configured to allow the driver assistance control unit 150 of each of the vehicles to communicate with a server S provided outside, e.g., in a ground station.

The preceding vehicle V1 and the following vehicle V2 may each sequentially transmit, to the server S, data regarding a current position, a direction of travel, and a travel state of the vehicle, and data regarding the tire force margin of the front inner wheel in cornering.

The data regarding the travel state of the vehicle may include, for example, the vehicle speed, the steering angle of the steering device, the longitudinal acceleration rate and the lateral acceleration rate acting on the vehicle body, and the yaw rate of the vehicle body, without limitation.

Let us define one of multiple vehicles communicating with the server S, as the preceding vehicle V1. In this case, the server S may identify the following vehicle V2 traveling following the preceding vehicle V1.

The server S may compare the current position and the direction of travel transmitted from the preceding vehicle V1, with high-precision 3D map data accumulated in advance, to identify a road and a traveling lane on which the preceding vehicle V1 is traveling.

When detecting another vehicle traveling within a predetermined inter-vehicle distance from the preceding vehicle V1 on the road or the traveling lane thus identified, the server S may define the relevant vehicle as the following vehicle V2.

When the tire force margin of the front inner wheel in cornering declines to the predetermined threshold value or smaller as the preceding vehicle V1 travels, there is possibility that the similar situation occurs in the following vehicle 2 following the preceding vehicle V1.

Thus, the preceding vehicle V1 may transmit, to the server S, the tire force margin of the front inner wheel in cornering calculated in the preceding vehicle V1, and the driving operation that causes the restoration of the tire force margin, i.e., the same driving operation as the information presented on the display unit 160 in the preceding vehicle V1.

Upon receiving the data regarding the tire force margin and the driving operation, the server S may transmit these pieces of the data to the following vehicle V2.

Upon the following vehicle V2 receiving the data regarding the tire force margin and the driving operation from the server S, the driver assistance control unit 150 of the following vehicle V2 may display the received data regarding the tire force margin and the driving operation on the display device 160, and present the driver with the information.

As described, in the second embodiment, it is possible to produce the following effects in addition to similar effects to those of the first embodiment described above. When the tire force margin of the front inner wheel in cornering declines in the preceding vehicle V1, there is high possibility that the similar situation occurs in the following vehicle V2. Thus, by presenting the driver of the following vehicle V2 with the information regarding the driving operation command that causes the restoration of the tire force margin, it is possible to suppress in advance the tire force of the front inner wheel in cornering from becoming greater than the tire force limit in the following vehicle V2.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the driver assistance apparatus and the vehicle are not limited to the forgoing embodiments but may be altered as appropriate.

For example, in the embodiment, the vehicle 1 includes the front wheels as the main driving wheels directly coupled to the transmission, and the rear wheels as the sub-driving wheels coupled to the transmission through the transfer clutch. However, the disclosure is not limited thereto, but may be applied to a vehicle including rear wheels as main driving wheels and a vehicle transmitting a driving force to front and rear wheels with the use of a center differential.

Furthermore, the disclosure may be applied to a two-wheel drive vehicle in which either front wheels or rear wheels are driven.

(2) In the embodiment, the travel power source of the vehicle is, for example, an engine, or an internal combustion engine. However, the travel power source of the vehicle is not limited thereto. The disclosure is applicable to, for example, an engine-electric hybrid system or an electric vehicle using only an electric motor as a travel power source.

(3) For example, the driving stiffness or the braking stiffness of the tire, the vehicle body slip angle, the tire slip angle, and the tire vertical load to be used in the estimation of the driving forces may be calculated on-board by a processor mounted on the vehicle, but the disclosure is not limited thereto. A map generated based on a calculation result prepared in advance may be held in a storage medium. Necessary parameters may be read out from the map based on the travel state of the vehicle, e.g., the vehicle speed, the steering angle, the yaw rate, and the acceleration rate.

(4) In each of the embodiments, the driving operation command and the tire force margin are presented to the driver by, for example, image display. However, the presentation of the driving operation command and the tire force margin is not limited to the image display but may be made by other methods. For example, the presentation may be made by sound, by a color, an amount of light, and a light emission mode of an indicator lamp, or by vibration of a member the driver touches. The light emission mode of the indicator lamp may be, for example, lighting or blinking.

(5) In the second embodiment, the driving operation command and the tire force margin are transmitted from the preceding vehicle V1 to the following vehicle V2 by the communication through the server. However, the disclosure is not limited thereto. For example, the driving operation command and the tire force margin may be transmitted from the preceding vehicle to the following vehicle, for example, directly by inter-vehicle communication.

As described, according to the disclosure, it is possible to provide a driver assistance apparatus that makes it possible to present a driver with a driving operation that suppresses an excess over a tire force limit in cornering.

The engine control unit 110, the transmission control unit 120, the driving force distribution control unit 130, and the driver assistance control unit 150 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine control unit 110, the transmission control unit 120, the driving force distribution control unit 130, and the driver assistance control unit 150. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine control unit 110, the transmission control unit 120, the driving force distribution control unit 130, and the driver assistance control unit 150 illustrated in FIG. 1.

The invention claimed is:

1. A driver assistance apparatus comprising:
   a tire force margin calculation unit of a front inner wheel in cornering configured to estimate, on an occasion of cornering of a vehicle, a tire force limit and a tire force current value of the front inner wheel in cornering, and configured to calculate a tire force margin based on the tire force limit and the tire force current value;
   a driving operation command output unit configured to output, in accordance with a decline in the tire force margin of the front inner wheel in cornering, a driving operation command that causes restoration of the tire force margin; and
   an information presentation unit configured to present a driver who drives the vehicle with information regarding the driving operation command outputted by the driving operation command output unit.

2. A driver assistance apparatus comprising:
   a tire force margin calculation unit of a front inner wheel in cornering configured to estimate, on an occasion of cornering of a first vehicle, a tire force limit and a tire force current value of the front inner wheel in cornering, and configured to calculate a tire force margin based on the tire force limit and the tire force current value;

a driving operation command output unit configured to output, in accordance with a decline in the tire force margin of the front inner wheel in cornering, a driving operation command that causes restoration of the tire force margin; and an information presentation unit configured to present a driver who drives a second vehicle following the first vehicle, with information regarding the driving operation command outputted by the driving operation command output unit.

3. The driver assistance apparatus according to claim 1, wherein the information presentation unit is configured to present the driver with information regarding the tire force margin of the front inner wheel in cornering, together with the information regarding the driving operation command.

4. The driver assistance apparatus according to claim 2, wherein the information presentation unit is configured to present the driver with information regarding the tire force margin of the front inner wheel in cornering, together with the information regarding the driving operation command.

5. The driver assistance apparatus according to claim 1, wherein the driving operation command output unit is configured to output, in accordance with the decline in the tire force margin of the front inner wheel in cornering, the driving operation command including one or more of a decline in a driving force, an increase in a braking force, and a decrease in a front wheel steering angle.

6. The driver assistance apparatus according to claim 2, wherein the driving operation command output unit is configured to output, in accordance with the decline in the tire force margin of the front inner wheel in cornering, the driving operation command including one or more of a decline in a driving force, an increase in a braking force, and a decrease in a front wheel steering angle.

7. The driver assistance apparatus according to claim 1, further comprising a tire force margin calculation unit of a front outer wheel in cornering configured to estimate, on the occasion of cornering of the vehicle, a tire force limit and a tire force current value of the front outer wheel in cornering, and configured to calculate a tire force margin based on a difference between the tire force limit and the tire force current value, wherein the driving operation command output unit is configured to change, in accordance with a state of a decline in the tire force margin of the front outer wheel in cornering, content of the driving operation command to be outputted in accordance with the decline in the tire force margin of the front inner wheel in cornering.

8. The driver assistance apparatus according to claim 2, further comprising a tire force margin calculation unit of a front outer wheel in cornering configured to estimate, on the occasion of cornering of the first vehicle, a tire force limit and a tire force current value of the front outer wheel in cornering, and configured to calculate a tire force margin based on a difference between the tire force limit and the tire force current value, wherein the driving operation command output unit is configured to change, in accordance with a state of a decline in the tire force margin of the front outer wheel in cornering, content of the driving operation command to be outputted in accordance with the decline in the tire force margin of the front inner wheel in cornering.

9. A driver assistance apparatus comprising circuitry configured to:

estimate, on an occasion of cornering of a vehicle, a tire force limit and a tire force current value of a front inner wheel in cornering, and calculate a tire force margin based on the tire force limit and the tire force current value;

output, in accordance with a decline in the tire force margin of the front inner wheel in cornering, a driving operation command that causes restoration of the tire force margin; and present a driver who drives the vehicle with information regarding the driving operation command outputted.

10. A driver assistance apparatus comprising circuitry configured to:

estimate, on an occasion of cornering of a first vehicle, a tire force limit and a tire force current value of a front inner wheel in cornering, and calculate a tire force margin based on the tire force limit and the tire force current value;

output, in accordance with a decline in the tire force margin of the front inner wheel in cornering, a driving operation command that causes restoration of the tire force margin; and present a driver who drives a second vehicle following the first vehicle, with information regarding the driving operation command outputted.

* * * * *